(12) United States Patent
Keeth

(10) Patent No.: US 11,983,059 B2
(45) Date of Patent: May 14, 2024

(54) MEMORY EXPANSION CARD

(71) Applicant: Micron Technology, Inc., Boise, ID (US)

(72) Inventor: Brent Keeth, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 241 days.

(21) Appl. No.: 17/541,524

(22) Filed: Dec. 3, 2021

(65) Prior Publication Data

US 2022/0179463 A1 Jun. 9, 2022

Related U.S. Application Data

(60) Provisional application No. 63/121,039, filed on Dec. 3, 2020.

(51) Int. Cl.
*G06F 1/3225* (2019.01)
*G06F 13/16* (2006.01)
*G06F 13/40* (2006.01)

(52) U.S. Cl.
CPC ........ *G06F 1/3225* (2013.01); *G06F 13/1678* (2013.01); *G06F 13/409* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,455,746 A * | 10/1995 | Sato | ...................... | G06F 13/409 361/752 |
| 6,532,152 B1 * | 3/2003 | White | ............... | G02F 1/133308 312/223.1 |
| 8,917,571 B2 * | 12/2014 | Chow | ................... | G11C 11/408 365/185.25 |
| 9,569,144 B2 * | 2/2017 | Uematsu | ................. | G06F 3/068 |
| 9,818,707 B2 * | 11/2017 | Oh | ......................... | H10B 63/84 |
| 10,592,445 B2 * | 3/2020 | Nale | .................... | G11C 11/4096 |
| 11,500,576 B2 * | 11/2022 | Chen | ..................... | G06F 3/0655 |
| 11,631,443 B2 * | 4/2023 | Yu | ....................... | G11C 11/4096 365/191 |
| 2008/0253085 A1 * | 10/2008 | Soffer | ..................... | H05K 1/185 361/679.46 |
| 2009/0210600 A1 * | 8/2009 | Jeddeloh | ............. | G06F 13/1657 710/305 |
| 2015/0117091 A1 * | 4/2015 | Maheshwari | ......... | G11C 11/419 365/230.03 |

(Continued)

*Primary Examiner* — Lisa Lea-Edmonds
(74) *Attorney, Agent, or Firm* — Brooks, Cameron & Huebsch, PLLC

(57) ABSTRACT

The present disclosure includes apparatuses and methods related to a memory expansion card suitable for, relative to other memory solutions, a high-speed interface and low power consumption. The memory expansion card can have on-die error correction code (ECC) circuitry and, in some examples, additional on-board circuitry, components, or capability to manage, relative to other memory solutions, a large number of volatile or non-volatile memory devices. A memory expansion card may have a controller with a host interface capable of using or defined according to a quantity of bits (i.e., a bit width), which may be eight bits. The controller may coupled to memory devices via several channels, and each channel may have the bit width of the interface.

19 Claims, 26 Drawing Sheets

(56) References Cited

U.S. PATENT DOCUMENTS

| | | | |
|---|---|---|---|
| 2016/0044779 A1* | 2/2016 | Soffer | G06F 1/20 |
| | | | 361/764 |
| 2019/0380208 A1* | 12/2019 | Bailey | H05K 3/30 |
| 2020/0137896 A1* | 4/2020 | Elenitoba-Johnson | |
| | | | G06F 13/4221 |
| 2021/0257338 A1* | 8/2021 | Keeth | H01L 24/24 |
| 2021/0318956 A1* | 10/2021 | Keeth | G06F 12/0653 |
| 2022/0004317 A1* | 1/2022 | Leslie | G06F 12/0207 |
| 2022/0179463 A1* | 6/2022 | Keeth | G06F 13/409 |

* cited by examiner

|    | 1      | 2     | 3          | 4          | 5     | 6     | 7     | 8     | 9     | 10    | 11         | 12    | 13         | 14    | 15   |
|----|--------|-------|------------|------------|-------|-------|-------|-------|-------|-------|------------|-------|------------|-------|------|
| A  | NC     | NC    | VDDQ       | DMD_A      | VSS   | VDD2L | VDD2H | VDD2H | VDD2H | VDD2L | VSS        | DM1_A | VDDQ       | NC    | NC   |
| B  | NC     | VDDQ  | RDQS0_T_A  | VSS        | DQ4_A | VDD2L | VDD2H | VSS   | VDD2H | VDD2L | DQ12_A     | VSS   | RDQS1_T_A  | VDDQ  | NC   |
| C  | VDD1   | DQ1_A | VDDQ       | RDQS0_C_A  | VSS   | DQ5_A | VDD2H | VSS   | VDD2H | DQ13_A| VSS        | RDQS1_C_A | VDDQ   | DQ9_A | VDD1 |
| D  | DQ0_A  | VSS   | DQ3_A      | VDDQ       | WCK0_C_A | VSS| VSS   | VDD2H | VSS   | VSS   | WCK1_C_A   | VDDQ  | DQ11_A     | VSS   | DQ8_A |
| E  | VSS    | DQ2_A | VSS        | WCK0_T_A   | VDDQ  | DQ6_A | VDD2H | VSS   | VDD2H | DQ14_A| VDDQ       | WCK1_T_A | VSS     | DQ10_A| VSS  |
| F  | VDDQ   | VSS   | VDDQ       | VDDQ       | DQ7_A | VDD2H | VDD2H | VSS   | VDD2H | VDD2H | DQ15_A     | VDDQ  | VDDQ       | VSS   | VDDQ |
| G  | VDDQ   | VDDQ  | VSS        | CA0_A      | VSS   | CS1_A | VSS   | CA2_A | VSS   | CA4_A | VSS        | CA6_A | VSS        | VDDQ  | VDDQ |
| H  | Reset_N| VDD2L | VSS        | VSS        | CA1_A | VSS   | CS0_A | VSS   | CK_t_A| VSS   | CA3_A      | VSS   | CA5_A      | VDD2L | ZQ_A |
| J  | VSS    | VDD2L | VSS        | RFU        | VDD2H | RFU   | VSS   | VSS   | CK_c_A| VSS   | VDD2H      | VSS   | VSS        | VDD2L | VSS  |
| K  | VDD2H  | VDD2H | VDD2H      | VDD2H      | VDD2H | VDD2H | VSS   | VSS   | VSS   | VDD2H | VDD2H      | VDD2H | VDD2H      | VDD2H | VDD2H|
| L  | VSS    | VSS   | VSS        | VSS        | VSS   | VDD2H | VDD2H | VDD2H | VDD2H | VSS   | VSS        | VSS   | VSS        | VSS   | VSS  |
| M  | VDD2H  | VDD2H | VDD2H      | VDD2H      | VDD2H | VDD2H | VSS   | VSS   | VSS   | VDD2H | VDD2H      | VDD2H | VDD2H      | VDD2H | VDD2H|
| N  | VSS    | VDD2L | VSS        | VSS        | VDD2H | VSS   | NC    | VSS   | VSS   | VSS   | VDD2H      | VSS   | VSS        | VDD2L | VSS  |
| P  | NC     | VDD2L | NC         | VSS        | NC    | VSS   | NC    | VSS   | NC    | VSS   | NC         | VSS   | VSS        | VDD2L | NC   |
| R  | VDDQ   | VDDQ  | VSS        | NC         | VSS   | NC    | VSS   | NC    | VSS   | NC    | VSS        | NC    | VSS        | VDDQ  | VDDQ |
| T  | VDDQ   | VSS   | VDDQ       | VDDQ       | NC    | VDD2H | VDD2H | VSS   | VDD2H | VDD2H | NC         | VDDQ  | VDDQ       | VSS   | VDDQ |
| V  | VSS    | NC    | VSS        | NC         | VDDQ  | NC    | VDD2H | VSS   | VDD2H | NC    | VDDQ       | NC    | VSS        | NC    | VSS  |
| W  | NC     | VSS   | NC         | VDDQ       | NC    | VSS   | VSS   | VDD2H | VSS   | VSS   | NC         | VDDQ  | NC         | VSS   | NC   |
| Y  | VDD1   | NC    | VDDQ       | NC         | VSS   | NC    | VDD2H | VSS   | VDD2H | NC    | VSS        | NC    | VDDQ       | NC    | VDD1 |
| AA | NC     | VDDQ  | NC         | VSS        | NC    | VDD2L | VDD2H | VSS   | VDD2H | VDD2L | NC         | VSS   | NC         | VDDQ  | NC   |
| AB | NC     | NC    | VDDQ       | NC         | VSS   | VDD2L | VDD2H | VDD2H | VDD2H | VDD2L | VSS        | NC    | VDDQ       | NC    | NC   |

*FIG. 3*

| Dimensions | Comments |
|---|---|
| A6 | Device thickness includes enclosure |
| A7 | PCB at LED and card edge connector to outer thickness |
| A8 | Straightness |
| B4 | Device width |
| B5 | Center - Connector Pin A1 location from Datum X |
| B6 | Control dimension for x4 card edge; TA-1002 DATUM "E" |
| B7 | Straightness |
| B8 | Label/Fin placement region |
| B9 | Host alignment structure region (reference) |
| B10 | Control dimension for x8 card edge; TA-1002 DATUM "F" |
| B11 | Datum "W" to LED center position |
| C3 | Device length |
| C4 | Datum Y to latch area keep out zone |
| C5 | Minimum Conductive area length |
| C6 | Bottom conductive area 1 x position |
| C7 | Bottom conductive area length |
| C8 | Datum "Y" to Datum "T" (edge of enclosure) |
| D6 | LED edge closest to latch area |
| D7 | Green LED center position |
| D8 | Amber LED center position |
| E8 | Mounting Hole 1 y position |
| E9 | Mounting Hole 2 y position |
| E10 | Mounting Hole 1 x and 2 x position |
| E11 | Mounting Thru Hole Diameter |
| E12 | Mounting Counterbore Diameter |
| E13 | Mounting Counterbore Depth |
| E14 | Position Tolerance |
| E15 | Latch mounting area thickness |
| E16 | Card Edge to Mounting Hole 1 x and 2 x Position |

*FIG. 4A*

|   | 1 | 2 | 3 | 4 | 5 | 6 | 7 | 8 | 9 |   |
|---|---|---|---|---|---|---|---|---|---|---|
| A | $V_{DD}$ | $V_{SSQ}$ | NF, NF/TDQS_c | | | | NF, NF/DM n/DBI_n/TDQS_t | $V_{SSQ}$ | $V_{DD}$ | A |
| B | $V_{PP}$ | $V_{DDQ}$ | DQS_c | | | | DQ1 | $V_{DDQ}$ | ZQ | B |
| C | $V_{DDQ}$ | DQ0 | DQS_t | | | | $V_{DD}$ | $V_{SS}$ | $V_{DDQ}$ | C |
| D | $V_{SSQ}$ | NF,DQ4 | DQ2 | | | | DQ3 | NF,DQ5 | $V_{SSQ}$ | D |
| E | $V_{SS}$ | $V_{DDQ}$ | NF,DQ6 | | | | NF,DQ7 | $V_{DDQ}$ | $V_{SS}$ | E |
| F | $V_{DD}$ | C2/ODT1 | ODT | | | | CK_t | CK_c | $V_{DD}$ | F |
| G | $V_{SS}$ | C0/CKE1 | CKE | | | | CS_n | C1/CS1_n | TEN/NF | G |
| H | $V_{DD}$ | WE_n/A14 | ACT_n | | | | CAS_n/A15 | RAS_n/A16 | $V_{SS}$ | H |
| J | $V_{REFCA}$ | BG0 | A10/AP | | | | A12/BC_n | BG1 | $V_{DD}$ | J |
| K | $V_{SS}$ | BA0 | A4 | | | | A3 | BA1 | $V_{SS}$ | K |
| L | RESET_n | A6 | A0 | | | | A1 | A5 | ALERT_n | L |
| M | $V_{DD}$ | A8 | A2 | | | | A9 | A7 | $V_{PP}$ | M |
| N | $V_{SS}$ | A11 | PAR | | | | A17/NF/NC, NF/NC | A13 | $V_{DD}$ | N |

*FIG. 11*

| Refresh Requirements | Symbol | 2 GB | 3 GB | 4 GB | 6 GB | 8 GB | 12 GB | 16 GB | 24 GB | 32 GB | Units |
|---|---|---|---|---|---|---|---|---|---|---|---|
| Number of Banks | | 16 | 16 | 16 | 16 | 16 | 16 | 16 | 16 | 16 | |
| Refresh Window (tREFW) (TCASE ≤ 85°C) | tREFW | 32 | 32 | 32 | 32 | 32 | 32 | 32 | 32 | 32 | ms |
| Refresh Window (tREFW) (1/2 Rate Refresh) | tREFW | 16 | 16 | 16 | 16 | 16 | 16 | 16 | 16 | 16 | ms |
| Refresh Window (tREFW) (1/4 Rate Refresh) | tREFW | 8 | 8 | 8 | 8 | 8 | 8 | 8 | 8 | 8 | ms |
| Required Number of REFRESH Commands in a tREFW Window | R | 8192 | 8192 | 8192 | 8192 | 8192 | 8192 | 8192 | 8192 | 8192 | |
| Average Refresh Interval REFab | tREFI | 3.906 | 3.906 | 3.906 | 3.906 | 3.906 | 3.906 | 3.906 | 3.906 | 3.906 | µs |
| Average Refresh Interval REFpb | tREFIpb | 488 | 488 | 488 | 488 | 488 | 488 | 488 | 488 | 488 | ns |
| Refresh Cycle Time (All Banks) | tRFCab | 130 | 180 | 180 | 280 | 280 | TBD | TBD | TBD | TBD | ns |
| Refresh Cycle Time (Per Bank) | tRFCpb | 60 | 90 | 90 | 140 | 140 | TBD | TBD | TBD | TBD | ns |
| Per-Bank Refresh to Per-Bank Refresh Different Bank Time | tpbR2pbR | 60 | 90 | 90 | 90 | 90 | TBD | TBD | TBD | TBD | ns |
| REFpb to ACTIVATE Command to Different Bank | tpbR2act | 7.5 | 7.5 | 7.5 | 7.5 | 7.5 | TBD | TBD | TBD | TBD | |

FIG. 18

| Command | Refresh Mode | Parameter | Temperature | Expression | Value | Unit |
|---|---|---|---|---|---|---|
| REFab | Normal | $t_{REFI1}$ | 0°C <= $T_{CASE}$ <= 85°C | $t_{REFI}$ | 3.9 | μs |
| | | | 85°C < $T_{CASE}$ <= 95°C | $t_{REFI}/2$ | 1.95 | μs |
| REFab | Fine Granularity | $t_{REFI2}$ | 0°C <= $T_{CASE}$ <= 85°C | $t_{REFI}/2$ | 1.95 | μs |
| | | | 85°C < $T_{CASE}$ <= 95°C | $t_{REFI}/4$ | 0.975 | μs |
| REFsb | Fine Granularity | $t_{REFIsb}$ | 0°C <= $T_{CASE}$ <= 85°C | $t_{REFI}/(2*n)$ | 1.95/n | μs |
| | | | 85°C < $T_{CASE}$ <= 95°C | $t_{REFI}/(4*n)$ | 0.975/n | μs |

*FIG. 19*

| Refresh Operation | Parameter | 8 Gb | 16 Gb | 24 Gb | 32 Gb | Units |
|---|---|---|---|---|---|---|
| Normal | $t_{RFC1,min}$ | 195 | 395 | TBD | TBD | ns |
| Fine (FGR mode) | $t_{RFC2,min}$ | 130 | 160 | TBD | TBD | ns |
| Same Bank (REFsb) | $t_{RFCsb,min}$ | 115 | 130 | TBD | TBD | ns |

| | 18 | 19 | 20 | 21 | 22 | 23 | 24 | 25 | 26 | 27 | 28 | 29 | 30 | 31 | 32 | 33 | 34 | 35 | 36 | 37 |
|---|---|---|---|---|---|---|---|---|---|---|---|---|---|---|---|---|---|---|---|---|
| AU | CS7 | DQ8 | DQ9 | CA8 | CA7 | CS7 | DQ11 | DQ10 | CA6 | CA8 | CS5 | DQ3 | DQ2 | CA1 | CA0 | CS5 | DQ0 | DQ1 | CA0 | CA1 |
| AT | NC | GND | DQ10 | CA6 | CA5 | NC | GND | DQ9 | CA7 | CA5 | CS2 | GND | DQ1 | CA2 | CA3 | CS2 | GND | DQ2 | CA2 | CA3 |
| AR | CS3 | NC | RDQS1_C | DQ11 | CA4 | CS3 | DQ8 | DMI1 | CA4 | WCK1_T | CS1 | DQ0 | DMI0 | GND | WCK0_T | CS1 | RDQS0_C | DQ3 | GND | WCK0_C |
| AP | GND | DQ12 | RDQS1_T | GND | RESET_N | GND | RDQS1_T | RDQS1_C | GND | WCK1_C | GND | NC | RDQS0_T | RDQS0_C | WCK0_C | GND | RDQS0_T | DQ5 | DQ4 | WCK0_T |
| AN | CS4 | DQ15 | DQ13 | CK_C | CK_T | CS4 | DQ15 | DQ14 | DQ13 | CK_T | CS0 | DQ13 | DQ6 | DQ7 | CK_T | CS0 | DMI0 | DQ7 | DQ6 | WCK1_T |
| AM | DMI1 | GND | DQ14 | WCK1_T | WCK1_C | NC | GND | DQ12 | DQ4 | CK_C | CS6 | GND | DQ5 | DQ4 | WCK1_C | CS6 | GND | DQ14 | DQ15 | WCK1_C |
| AL | CS0 | DQ7 | DQ6 | WCK0_T | WCK0_C | CS6 | DQ5 | DQ7 | DQ6 | WCK0_C | NC | DQ15 | DQ12 | DQ14 | WCK1_T | CS4 | DQ12 | NC | DQ13 | CK_C |
| AK | GND | DMI0 | DQ5 | GND | DQ4 | GND | RDQS0_T | RDQS0_C | GND | WCK0_T | GND | RDQS1_C | RDQS1_T | GND | WCK1_T | GND | RDQS1_C | RDQS1_T | GND | CK_T |
| AJ | CS1 | CS5 | DQ3 | RDQS0_C | RDQS0_T | CS0 | CS1 | DQ0 | DMI0 | NC | CS4 | DQ8 | DMI1 | CA4 | NC | CS3 | DQ11 | DMI1 | CA5 | RESET_N |
| AH | CS2 | GND | DQ2 | CA2 | CA3 | CS2 | GND | DQ1 | CA3 | CA2 | CS3 | GND | DQ9 | CA7 | CA5 | CS7 | GND | DQ10 | CA6 | CA4 |
| AG | CS5 | DQ0 | DQ1 | CA0 | CA1 | CS5 | DQ3 | DQ2 | CA0 | CA1 | CS7 | DQ11 | DQ10 | CA6 | CA8 | NC | DQ8 | DQ9 | CA8 | CA7 |

0.80mm Pitch

|   | 1 | 2 | 3 | 4 | 5 | 6 | 7 | 8 | 9 | 10 | 11 | 12 |   |
|---|---|---|---|---|---|---|---|---|---|----|----|----|---|
| A | DNU | DNU | VSS | VDD2 | ZQ_A | | | VSS | VDD | VSS | DNU | DNU | A |
| B | DNU | DQ0_A | VDDQ | DQ7_A | VDDQ | | | VDDQ | DQ15_A | VDDQ | DQ8_A | DNU | B |
| C | VSS | DQ1_A | DMI0_A | DQ6_A | VSS | | | VSS | DQ14_A | DMI1_A | DQ9_A | VSS | C |
| D | VDDQ | VSS | RDQS0_T_A | VSS | WCK0_T_A | | | WCK1_T_A | VSS | RDQS1_T_A | VSS | VDDQ | D |
| E | VSS | DQ2_A | RDQS0_C_A | DQ5_A | WCK0_C_A | | | WCK1_C_A | DQ13_A | RDQS1_C_A | DQ10_A | VSS | E |
| F | VDD2L | DQ3_A | VDDQ | DQ4_A | VDD2 | | | VDD2 | DQ12_A | VDDQ | DQ11_A | VDD2L | F |
| G | VSS | CS5_A | VSS | VDD2L | VSS | | | VSS | VDD2L | VSS | CS7_A | VSS | G |
| H | VDD2 | CA0_A | CS2_A | CS1_A | CS0_A | | | CS4_A | CS3_A | VDD2 | CS7_A | CA8_A | H |
| J | VSS | CA1_A | CA2_A | VDD2 | VSS | | | CK_C_A | CK_T_A | CA5_A | CS6_A | VSS | J |
| K | VDD2 | VSS | CA3_A | VSS | CS6_A | | | NC | VSS | CA4_A | VSS | VDD2 | K |
| L | | | | | | | | | | | | | L |
| M | | | | | | | | | | | | | M |
| N | VDD2 | VSS | CA3_B | VSS | CS6_B | | | RESET_N | VSS | CA4_B | VSS | VDD2 | N |
| P | VSS | CA1_B | CA2_B | VDD2 | VSS | | | CK_C_B | CK_T_B | CA5_B | CS6_B | VSS | P |
| R | VDD2 | CA0_B | CS2_B | CS1_B | CS0_B | | | CS4_B | CS3_B | VDD2 | CS7_B | CA8_B | R |
| T | VSS | CS5_B | VSS | VDD2L | VSS | | | VSS | VDD2L | VSS | CS7_B | VSS | T |
| U | VDD2L | DQ3_B | VDDQ | DQ4_G | VDD2 | | | VDD2 | DQ12_B | VDDQ | DQ11_B | VDD2L | U |
| V | VSS | DQ2_B | RDQS0_C_B | DQ5_B | WCK0_C_B | | | WCK1_C_B | DQ13_B | RDQS1_C_B | DQ10_B | VSS | V |
| W | VDDQ | VSS | RDQS0_T_B | VSS | WCK0_T_B | | | WCK1_T_B | VSS | RDQS1_T_B | VSS | VDDQ | W |
| Y | VSS | DQ1_B | DMI0_B | DQ6_B | VSS | | | VSS | DQ14_B | DMI1_B | DQ9_B | VSS | Y |
| AA | DNU | DQ0_B | VDDQ | DQ7_B | VDDQ | | | VDDQ | DQ15_B | VDDQ | DQ8_B | DNU | AA |
| AB | DNU | DNU | VSS | VDD2 | VSS | | | VSS | VDD2 | VSS | DNU | DNU | AB |
|   | 1 | 2 | 3 | 4 | 5 | 6 | 7 | 8 | 9 | 10 | 11 | 12 |   |

0.65mm Pitch (vertical)

*FIG. 25*

| LP5 Channels | Mode | Die/Rank | Ranks | Channels/Package | Die/Package | Die Capacity (Gb) | Card Capacity (Gb) |
|---|---|---|---|---|---|---|---|
| 8 | X16 | 1 | 4 | 1 | 4 | 16 | 64 |
| 8 | X8 | 2 | 4 | 1 | 8 | 16 | 128 |
| 16 | X16 | 1 | 4 | 2 | 8 | 16 | 128 |
| 16 | X8 | 2 | 4 | 2 | 16 | 16 | 256 |
| 16 | X16 | 1 | 8 | 2 | 16 | 16 | 256 |
| 16 | X8 | 2 | 8 | 2 | 32 | 16 | 512 |
| 8 | X16 | 1 | 4 | 1 | 4 | 32 | 128 |
| 8 | X8 | 2 | 4 | 1 | 8 | 32 | 256 |
| 16 | X16 | 1 | 4 | 2 | 8 | 32 | 256 |
| 16 | X8 | 2 | 4 | 2 | 16 | 32 | 512 |
| 16 | X16 | 1 | 8 | 2 | 16 | 32 | 512 |
| 16 | X8 | 2 | 8 | 2 | 32 | 32 | 1024 |
| 8 | X16 | 1 | 4 | 1 | 4 | 32 | 128 |
| 8 | X8 | 2 | 4 | 1 | 8 | 32 | 256 |
| 16 | X16 | 1 | 4 | 2 | 8 | 32 | 256 |
| 16 | X8 | 1 | 8 | 2 | 16 | 32 | 512 |
| 8 | X16 | 1 | 4 | 1 | 4 | 64 | 256 |
| 8 | X8 | 2 | 4 | 1 | 8 | 64 | 512 |
| 16 | X16 | 1 | 4 | 2 | 8 | 64 | 512 |
| 16 | X8 | 2 | 4 | 2 | 16 | 64 | 1024 |
| 16 | X16 | 1 | 8 | 2 | 16 | 64 | 1024 |
| 16 | X8 | 2 | 8 | 2 | 32 | 64 | 2048 |

*FIG. 26*

MEMORY EXPANSION CARD

PRIORITY INFORMATION

This application claims the benefit of U.S. Provisional Application No. 63/121,039, filed Dec. 3, 2020, the contents of which are incorporated by reference.

TECHNICAL FIELD

The present disclosure relates generally to memory devices, and more particularly, to apparatuses and methods related to a Compute Express Link attached memory expansion card.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

BRIEF DESCRIPTION OF THE DRAWINGS

FIG. 3 is a block diagram of a fine ball grid array according to the present disclosure.

FIG. 4A is a table describing a memory expansion card according to the present disclosure.

FIG. 11 is a schematic of ball assignments for an FBGA according to the present disclosure.

FIG. 18 is a table of LP5 refresh parameters according to the present disclosure.

FIG. 19 is a table of DDR5 refresh parameters according to the present disclosure.

FIG. 20 is a table of DDR5 refresh granularity parameters according to the present disclosure.

FIG. 24A is a block diagram of a controller of a memory expansion card according to the present disclosure.

FIG. 24B is an enlarged view of a portion of the controller illustrated in FIG. 24A.

FIG. 25 is a block diagram of a 200 ball package according to the present disclosure.

FIG. 26 is a table illustrating a range of capacity available for the memory expansion card for different arrangements and memory types.

DETAILED DESCRIPTION

Figure 1:
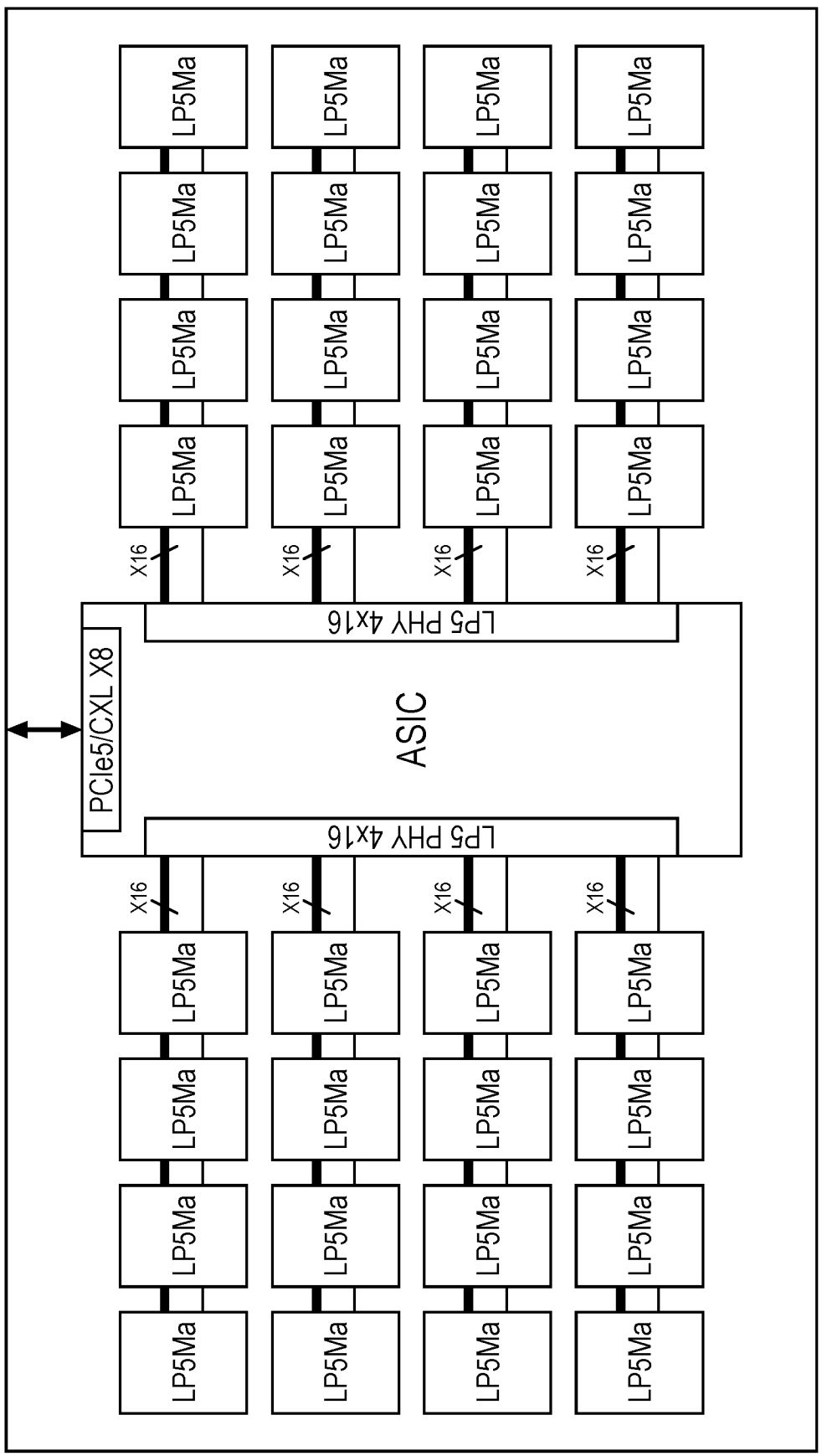
FIG. 1 is a block diagram of an apparatus in the form of a memory device with multi-channel serial operation and multi-rank modes according to the present disclosure.

The present disclosure includes apparatuses and methods related to a Compute Express Link (CXL) attached memory expansion card. CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. Examples of attached devices include graphics processing units (GPUs), field programmable gate arrays (FPGAs), etc. This permits user to simply focus on target workloads as opposed to the redundant memory management hardware in their accelerators.

CXL is designed to be an industry open standard interface for high-speed communications, as accelerators are increasingly used to complement CPUs in support of emerging applications such as artificial intelligence and machine learning. CXL technology is built on the peripheral component interconnect express (PCIe) infrastructure, leveraging PCIe physical and electrical interfaces to provide advanced protocol in areas such as input/output (I/O) protocol, memory protocol (e.g., initially allowing a host to share memory with an accelerator), and coherency interface. Table 1 provides examples of the performance of various PCIe architectures, where GT is gigatransfers, s is seconds, Gb is gigabits, MB is megabytes, and GB is gigabytes:

TABLE 1

| PCIe Architecture | Raw Bit Rate | Inter-connect Bandwidth | Bandwidth Lane Direction | Total Bandwidth for x16 Link |
|---|---|---|---|---|
| PCIe 1.1 | 2.5 GT/s | 2 Gb/s | ~250 MB/s | ~8 GB/s |
| PCIe 2.0 | 5.0 GT/s | 4 Gb/s | ~500 MB/s | ~16 GB/s |
| PCIe 3.0 | 8.0 GT/s | 8 Gb/s | ~1 GB/s | ~32 GB/s |
| PCIe 4.0 | 16.0 GT/s | 16 Gb/s | ~2 GB/s | ~64 GB/s |
| PCIe 5.0 | 32.0 GT/s | 32 Gb/s | ~4 GB/s | ~128 GB/s |

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. Certain ranges are defined herein with respect to power usage as being "less than or equal to" followed by a given value in Watts to one decimal place (e.g., less than or equal to 9.9 Watts). The usage of the phrase "less than or equal to" in this context herein means that the specified value is a ceiling and that the actual power usage is equal to that ceiling or less than the specified ceiling by one decimal value of the specified ceiling. For example, "less than or equal to 9.9 Watts" means that the power usage is 9.9 Watts or less, down to 9.8 Watts.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

A memory expansion card can be provided with a PCIe/CXL interface. A goal of the memory expansion card can be to improve or maximize memory capacity. The memory expansion card can have on-die error correction code (ECC) circuitry to improve reliability, availability, and scalability. The ECC circuitry can provide error detection and/or correction with functionality such as a cyclic redundancy check (CRC) for added reliability. In at least one embodiment, the ECC circuitry can be managed by a controller of the memory expansion card.

The controller of the memory expansion card can be implemented as hardware, firmware, and/or software. For example, the controller can be an application specific integrated circuit (ASIC) coupled to a printed circuit board including a physical interface. The controller can thereby relay command and/or address signals from a command/address bus from the host to the memory devices. In some embodiments, the controller may perform command and/or address translation of the command and/or address signals from the host before relaying the same to the memory devices. The controller may operate the command/address buses with a same or different protocol than that with which the command/address bus is operated between the host and the memory system. The controller can use the buses to send command and/or address signals, clock signals, select signals, and other related signals to the memory devices. The memory devices can use the buses to send error signals, reset signals, and other related signals to the controller. The controller thus provides access to the memory devices for the host. Examples of the commands for the memory devices include read, write, and erase commands for data on the memory devices, among other commands. The memory system can include separate integrated circuits, or both the controller and the memory devices can be on the same integrated circuit.

The memory can be provided in various forms, such as multi-rank, multi-channel, dual in-line memory module (DIMM) including memory devices operated as double data rate (DDR) DRAM, such as DDR5 (which may be abbreviated herein as "D5"), low power DDR (LPDDR), a graphics DDR DRAM, such as GDDR6, RAM, ROM, SDRAM, PCRAM, RRAM, flash memory, and three-dimensional cross-point, among others. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

FIG. 1 is a block diagram of an apparatus in the form of a memory device with multi-channel serial operation and multi-rank modes according to the present disclosure. Specifically, the memory module configuration illustrated includes a multi-channel ×16 serial operation mode and multi-rank (×16 LP5 mode) for the controller (ASIC) to interface with the individual memory die (labeled "LP5Ma"). LP5 refers to LPDDR5. There are 32 memory die per memory device (e.g., memory expansion card). The interface for the memory device is a PCIe5/CXL ×8 interface.

Figure 2:
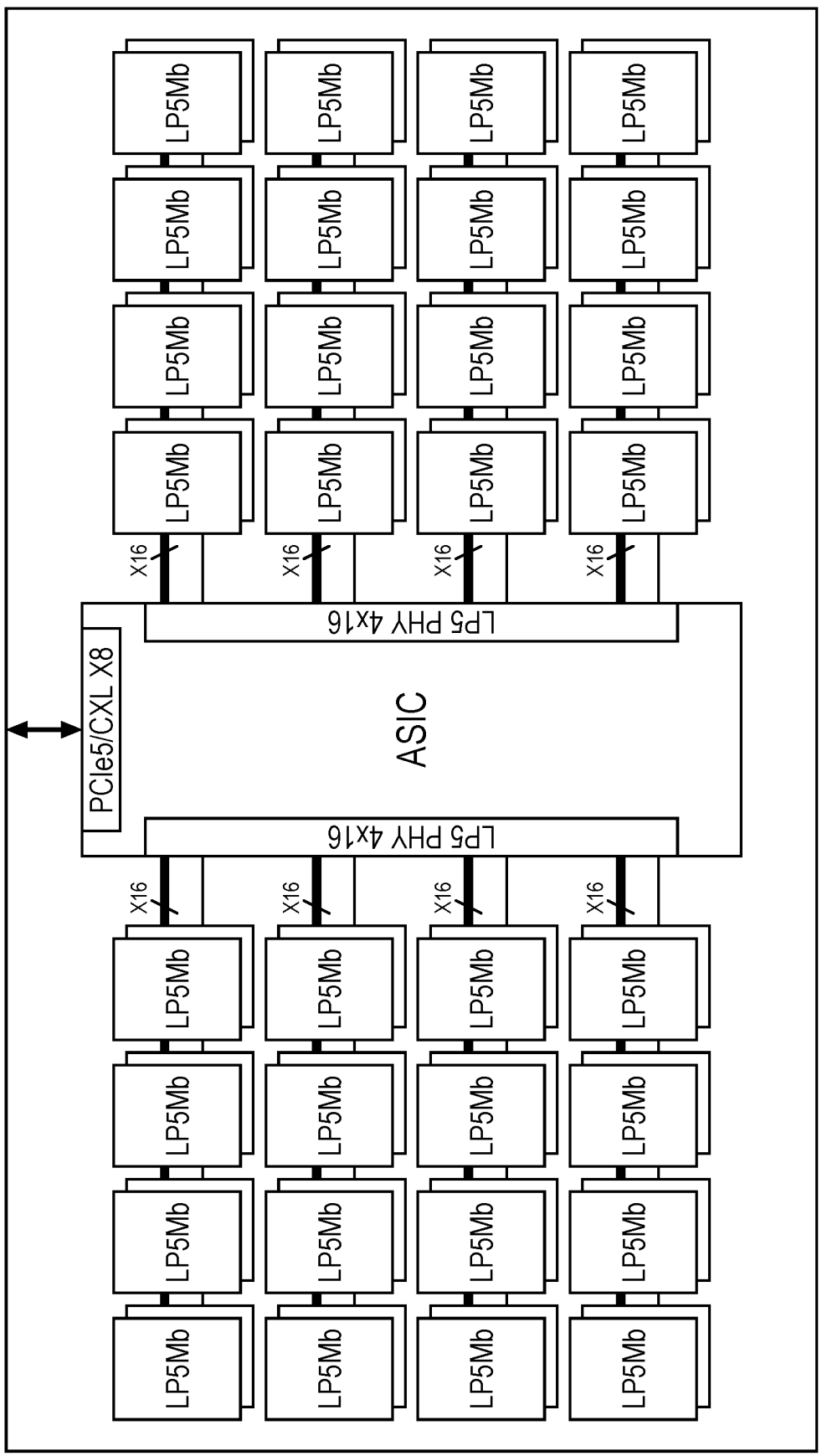
FIG. 2 is a block diagram of an apparatus in the form of a memory device multi-channel parallel/serial operation and multi-rank modes according to the present disclosure.

FIG. 2 is a block diagram of an apparatus in the form of a memory device multi-channel parallel/serial operation and multi-rank modes according to the present disclosure. Specifically, the memory module configuration illustrated includes a multi-channel ×16 parallel/serial operation mode and multi-rank (×8 LP5 mode) for the controller (ASIC) to interface with the individual memory die (labeled "LP5 Mb"). There are 64 memory die per memory device (e.g., memory expansion card), stacked in two layers of 32. The interface for the memory device is a PCIe5/CXL ×8 interface.

FIG. 3 is a block diagram of a fine ball grid array (FBGA) according to the present disclosure. Specifically, the FBGA is a discrete package for an LPDDR5 package. Although the illustrated FBGA includes 315 balls, embodiments are note so limited.

Figure 4B:
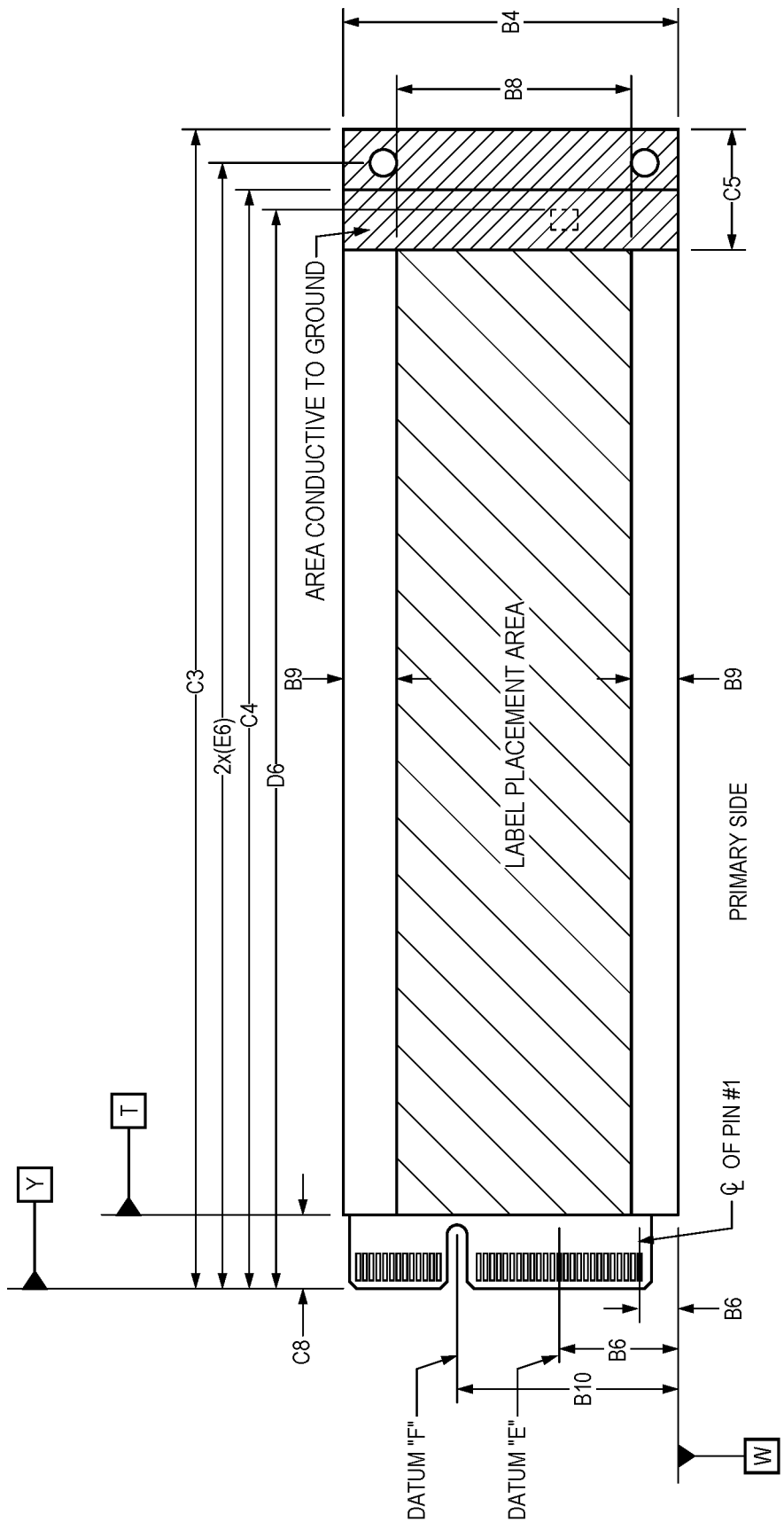
FIG. 4B is a schematic of the memory expansion card of FIG. 4A.

FIG. 4A is a table describing a memory expansion card according to the present disclosure. FIG. 4B is a schematic of the memory expansion card of FIG. 4A. The memory expansion card conform to the E1.S form factor. The memory expansion card can include a printed circuit board (PCB) and firmware to support a diverse grouping of thermal options geared toward either high density or high performance. The memory expansion card can include hot plug support and can work for both storage and compute in one rack unit servers. The memory expansion card can provide support for at least PCIe4 and PCIe5. The memory expansion card can have a standardized width and length (e.g., according to storage networking industry association/short form factor) but can have optional thicknesses. A high density memory expansion card can provide a power rating of 12 Watts (W) in a high density option. The addition of a heat spreader to the memory expansion card can allow the provision of a power rating of 16 W in a high density option. The addition of a symmetrical enclosure can allow the provision of a power rating of 20 W in a high density option. A high performance optional asymmetric enclosure can to allow for a heat sink thereon and can provide a power rating of 25 W.

According to at least one embodiment of the present disclosure, a memory expansion card can have a standardized width, a standardized length, a non-standardized thickness, and a heat spreader that allows the memory expansion card to operate at a greater power rating than a standardized memory expansion card having a standardized thickness.

According to at least one embodiment of the present disclosure, a memory expansion card can have a standardized width, a standardized length, a non-standardized thickness, and an enclosure that allows the memory expansion card to operate at a greater power rating than a standardized memory expansion card having a standardized thickness. The enclosure can be symmetric to provide for an intermediate power rating. The enclosure can be asymmetric to provide for a power rating as a function of the non-standardized thickness (e.g., where thicker memory expansion cards provide for a greater power rating). The memory expansion card can include a heat sink that allows the memory expansion card to operate at a greater power rating than the memory expansion card without the heat sink.

Figure 5:
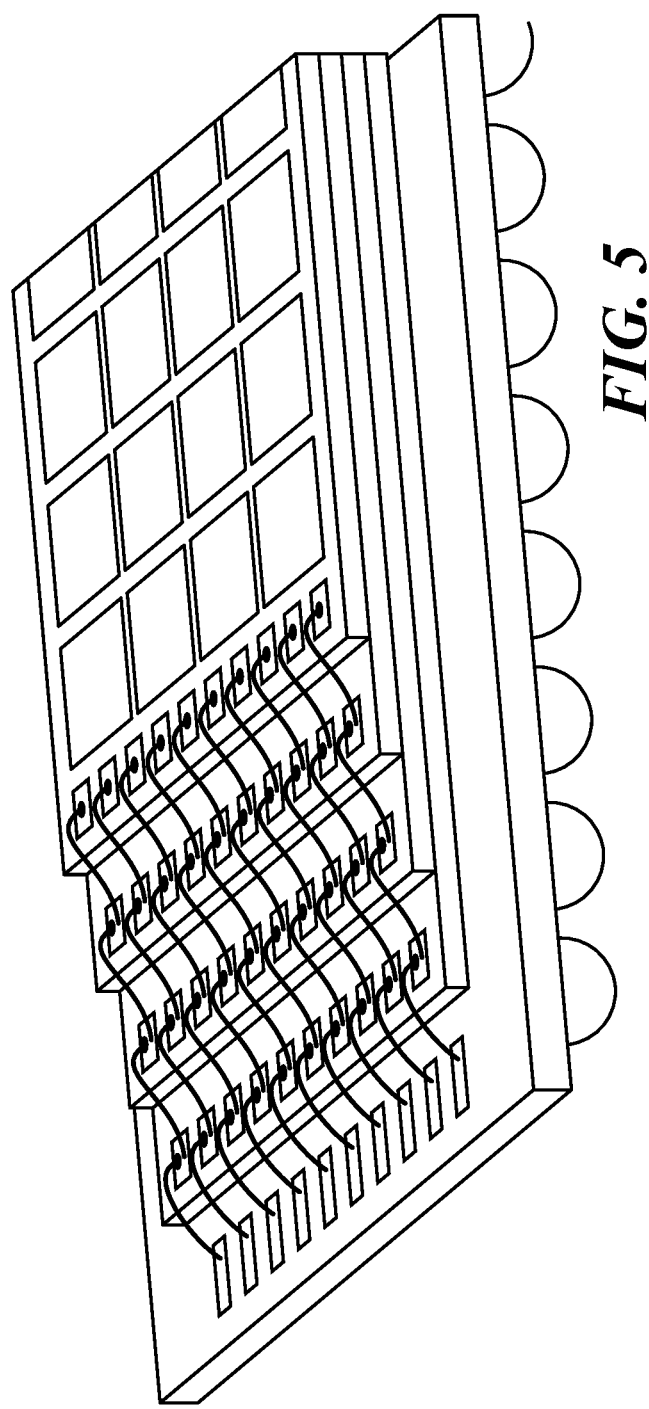
FIG. 5 is a perspective view of a custom package option of a memory expansion card according to the present disclosure.

FIG. 5 is a perspective view of a custom package option of a memory expansion card according to the present disclosure. The custom package option illustrated in FIG. 5 is a quad die package/quad rank package implemented using shingle stacking. The quad die package can use four chip select pins. Each of the die can be analogous to the FBGA illustrated in FIG. 3.

Figure 6:
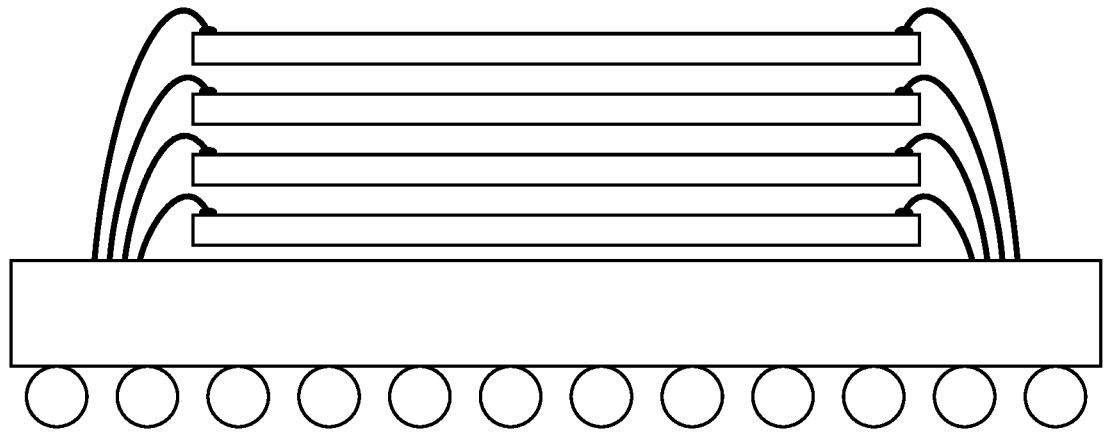
FIG. 6 is a side view of a custom package option of a memory expansion card according to the present disclosure.

FIG. 6 is a side view of a custom package option of a memory expansion card according to the present disclosure. The custom package option illustrated in FIG. 6 is analogous to that illustrated in FIG. 5, expect that the dies are stacked directly on top of each other.

Figure 7:
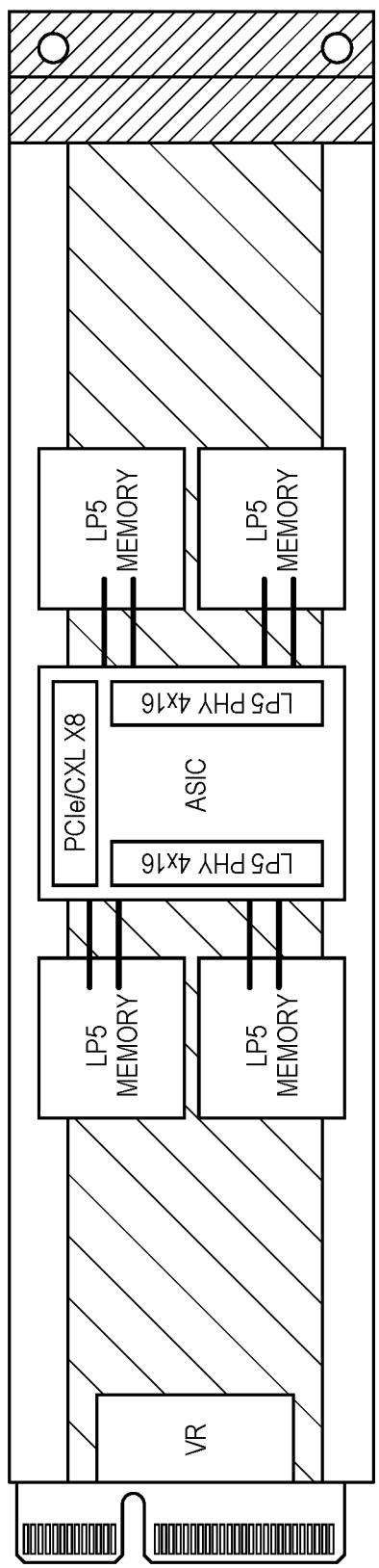
FIG. 7 is a block diagram of a memory expansion card having eight channels according to the present disclosure.

FIG. 7 is a block diagram of a memory expansion card having eight channels according to the present disclosure. The memory expansion card has multi-channel ×16 serial operation mode and 4 ranks. Each of the LP5 channels to the memory die can run at 4 GB/s. The memory can consume 4.44 W at full bandwidth of 64 GB/s (8 LP5 channels at 4000 Mb/s). The controller consumes about 5 W. The total power used by the memory expansion card is therefore less than or equal to 9.5 W. At 85% CXL link efficiency, the total power drops to 8.8 W. The capacity of the memory expansion card can be 128 GB for a quad die dual deck package or 512 GB for an 8-die dual deck package.

In some embodiments, although not specifically illustrated, memory die can be placed on the back side of the memory expansion card. For example, four memory dies (or packages) can be placed on the front side and four memory dies (or packages) can be placed on the back side. In such embodiments, four channels would be used on the front side (one for each die/package) and four channels would be used on the back side (one for each die/package). Although memory die can be placed on the back side, in some embodiments, only one ASIC would be placed on the memory expansion card (on the front side as illustrated).

According to at least one embodiment of the present disclosure, a memory expansion card can include a controller including an at least eight bit wide host interface and eight memory packages coupled to the controller by eight channels. Each channel can be sixteen bits wide and capable of operating at four gigabits per second. The memory expansion card can consume less than or equal to 9.5 Watts at full bandwidth. For example, the full bandwidth can be 64 gigabytes per second. The memory expansion card can consume less than or equal to 8.8 Watts at 85% host interface efficiency. Four of the memory packages can be on a same side of the memory expansion card as the controller and four of the memory packages can be on an opposite side of the memory expansion card as the controller. The host interface can be CXL compliant, the channels can be LPDDR5 compliant, and the memory expansion card can conform to the E1.S form factor.

Figure 8:
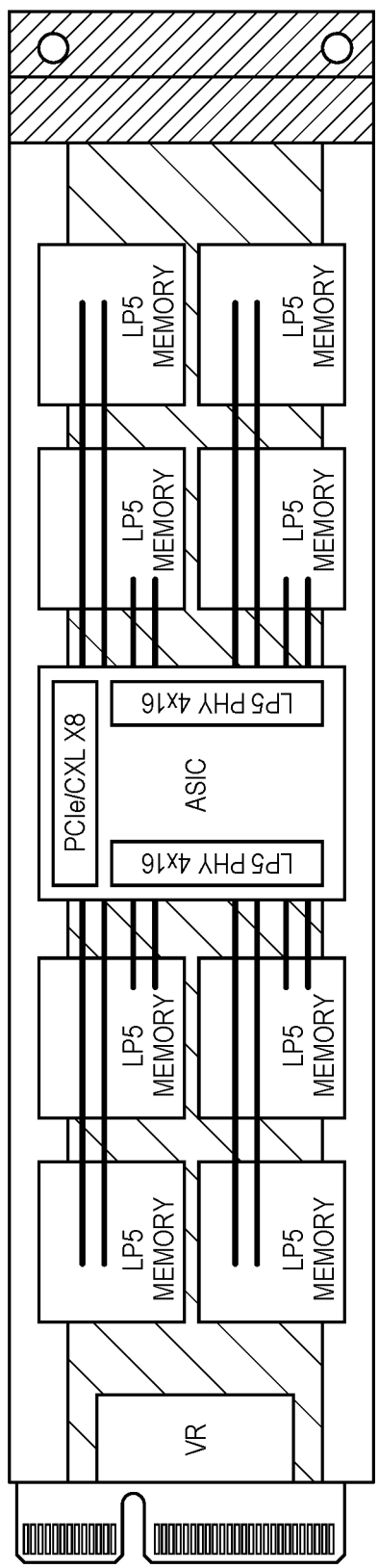
FIG. 8 is a block diagram of a memory expansion card having sixteen channels according to the present disclosure.

FIG. 8 is a block diagram of a memory expansion card having sixteen channels according to the present disclosure. The memory expansion card has multi-channel ×16 serial operation mode and 8 ranks. Each of the LP5 channels to the memory die can run at 2 GB/s. The memory can consume 4.44 W at full bandwidth of 64 GB/s (16 LP5 channels at 2000 Mb/s). The controller consumes about 7.5 W. The total power used by the memory expansion card is therefore less than or equal to 11.9 W. At 85% CXL link efficiency, the total power drops to 11.3 W. The capacity of the memory expansion card can be 256 GB for a quad die dual deck package or 1 terabyte (TB) for an 8-die dual deck package.

In some embodiments, although not specifically illustrated, memory die can be placed on the back side of the memory expansion card. For example, eight memory dies (or packages) can be placed on the front side and eight memory dies (or packages) can be placed on the back side. In such embodiments, eight channels would be used on the front side (one for each die/package) and eight channels would be used on the back side (one for each die/package). Although memory die can be placed on the back side, in some embodiments, only one ASIC would be placed on the memory expansion card (on the front side as illustrated).

Each host read/write request can be serviced by a single die. In some embodiments, the host read/write request size can be 64 B. Each channel can operate independently of the other channels. The controller driven redundancy, availability, and scalability features can accommodate the independent nature of the channels. Advantageously, the memory expansion card described herein provides relatively low power consumption for its performance capability.

According to at least one embodiment of the present disclosure, a memory expansion card can include a controller including an at least eight bit wide host interface and sixteen memory packages coupled to the controller by sixteen channels. Each channel can be sixteen bits wide and capable of operating at two gigabits per second. The memory expansion card can consume less than or equal to 11.9 Watts at full bandwidth. For example, the full bandwidth can be 64 gigabytes per second. The memory expansion card can consume less than or equal to 11.3 Watts at 85% host interface efficiency. Eight of the memory packages can be on a same side of the memory expansion card as the controller and eight of the memory packages can be on an opposite side of the memory expansion card as the controller. The host interface can be CXL compliant, the channels can be LPDDR5 compliant, and the memory expansion card can conform to the E1.S form factor.

Figure 9:
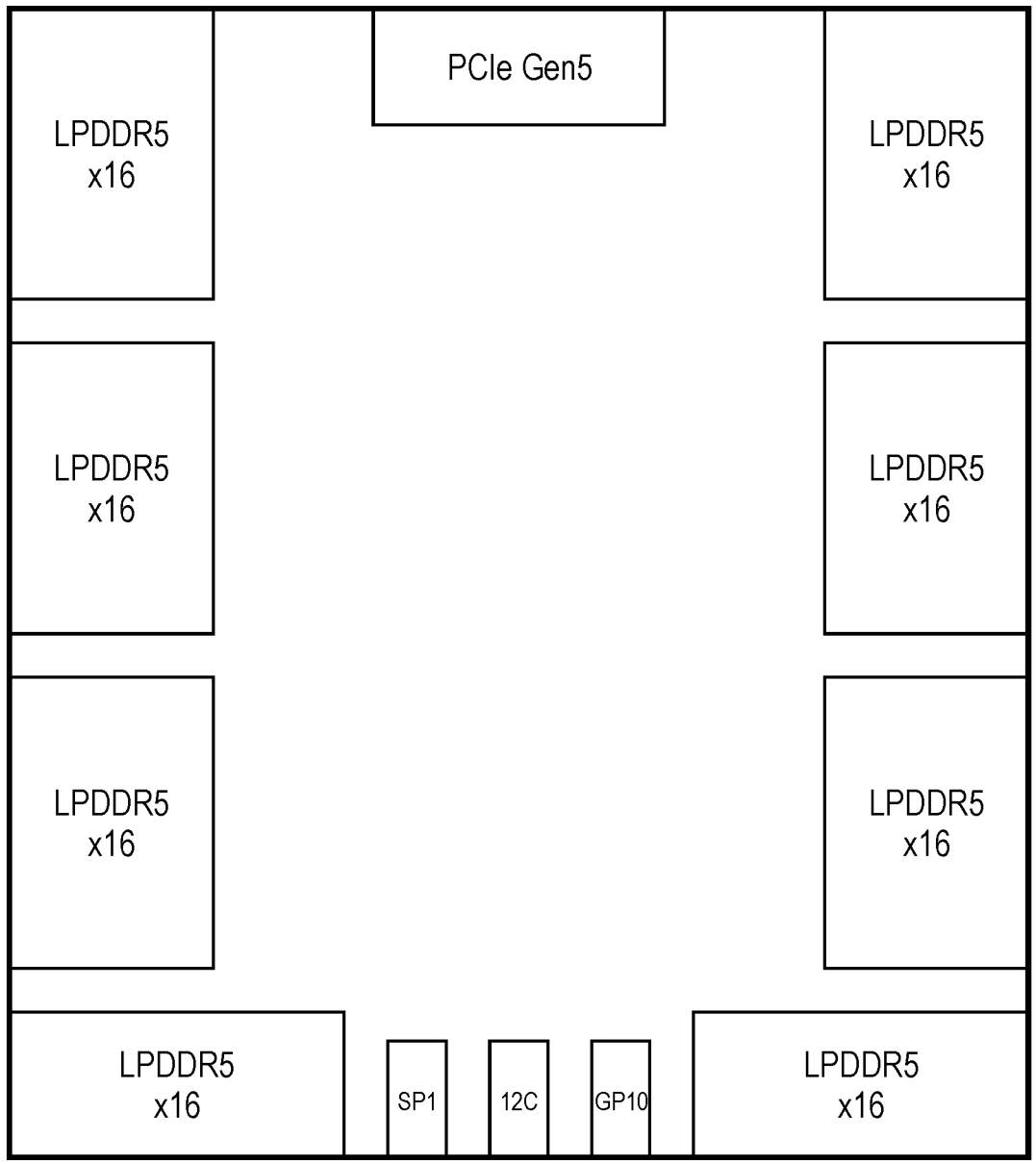
FIG. 9 is a block diagram of a controller of a memory expansion card according to the present disclosure.

FIG. 9 is a block diagram of a controller of a memory expansion card according to the present disclosure. The controller is based on the PCIe5 physical layer (PHY) and an LPDDR5 PHY. The controller interfaces can include one CXL (PCIe5) link with 8 transmission channels and 8 reception channels, for example. The memory can be interfaced with 8 LPDDR5 dies/packages and 16 channels. The controller can include interfaces for clocks (CLKs), serial presence interface (SPI), inter-integrated circuit (I2C), joint test action group (JTAG), and/or general purpose input/outputs (GPIOs). In at least one embodiment, the controller can have at least 780 pins.

Figure 10:
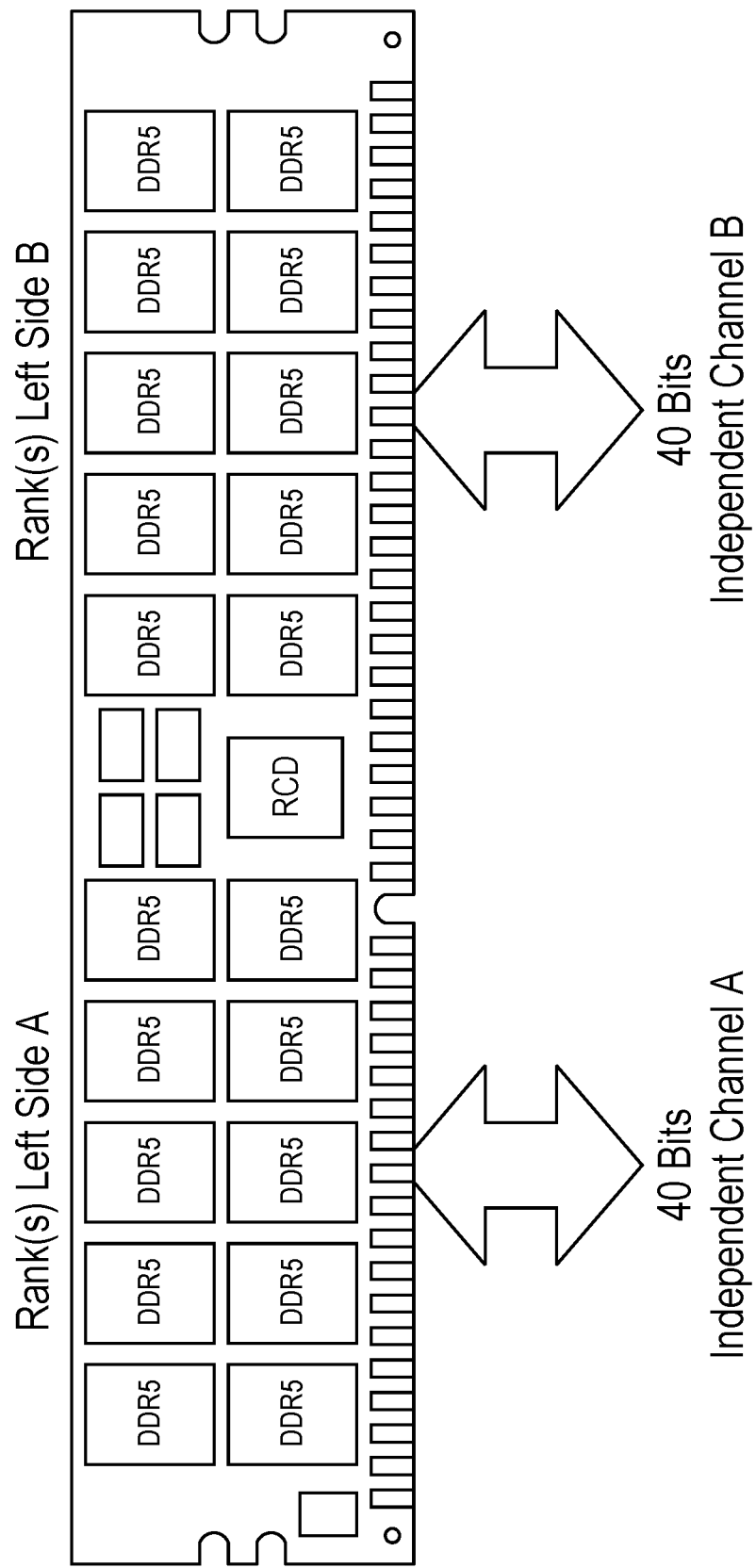
FIG. 10 is a block diagram of a dual in-line memory module configuration according to the present disclosure.

FIG. 10 is a block diagram of a DIMM configuration according to the present disclosure. The DIMM can be a 64 GB DDR5 2 rank registered DIMM (RDIMM) in at least one embodiment. The power of the DIMM can be 12 W at 38 GB/s (4800 Mb/s). The power of the memory (e.g., DRAMs) can be 9 W.

FIG. 11 is a schematic of ball assignments for an FBGA according to the present disclosure. In some embodiments, the FBGA can include 78 balls, however embodiments are not so limited. The FBGA illustrated in FIG. 11 corresponds to the memory dies illustrated in FIG. 12.

Figure 12:
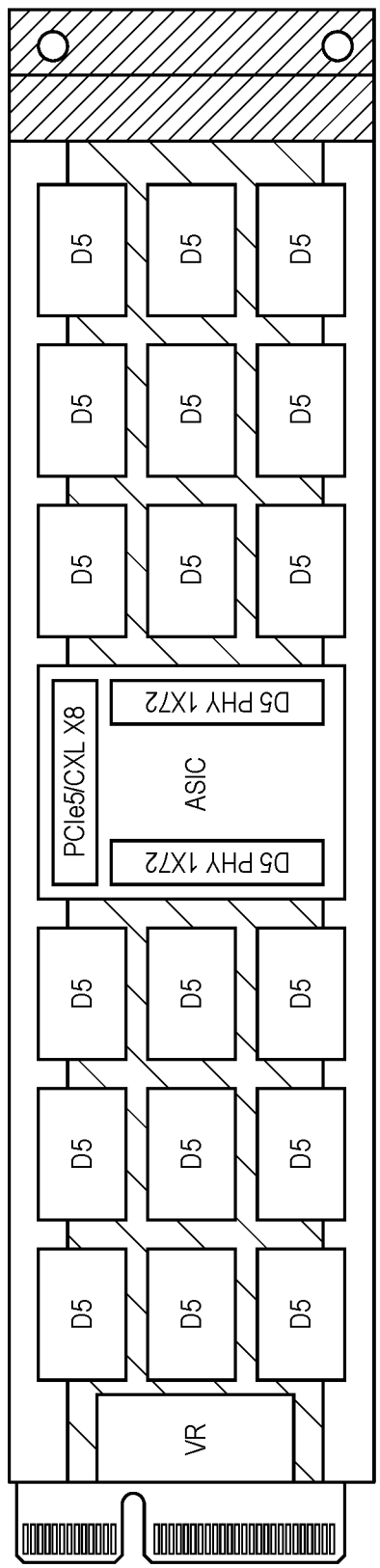
FIG. 12 is a block diagram of a memory expansion card having RDIMM equivalent memory according to the present disclosure.

FIG. 12 is a block diagram of a memory expansion card having RDIMM equivalent memory according to the present disclosure. The memory expansion card has dual D5 9×4 RDIMM equivalent memory. In a first configuration, the memory expansion card provides a 64 GB capacity and in a second configuration, the memory expansion card provides a 256 GB capacity. The D5 channels can run at 4 Gb/s. In an embodiment including one memory rank, the memory consumes 16.7 W at 64 GB/s. In an embodiment including two memory ranks, the memory consumes 24.2 W at 64 GB/s. The controller consumes about 7.5 W or 11 W.

According to at least one embodiment of the present disclosure, a memory expansion card can include a controller including an at least eight bit wide host interface and thirty-six memory packages, each including one die, coupled to the controller by two channels. Each channel can be seventy-two bits wide and capable of operating at four gigabits per second. The memory expansion card can consume less than or equal to 27.7 Watts at full bandwidth. Eighteen of the memory packages can be on a same side of the memory expansion card as the controller and eighteen of the memory packages can be on an opposite side of the memory expansion card as the controller. The host interface can be CXL compliant, and the memory expansion card can conform to the E1.S form factor.

In some embodiments, although not specifically illustrated, memory ranks can be placed on the back side of the memory expansion card in single or dual rank packages. For example, 36 single or dual die packages (including 36-72 dies) can be provided. The memory expansion card can include 2×72 D5 channels (e.g., with an ×36 subchannel front side and ×36 subchannel back side). Although memory die can be placed on the back side, in some embodiments, only one ASIC would be placed on the memory expansion card (on the front side as illustrated). Two register clock drivers (RCDs) can be placed on the back side, opposite the controller (ASIC).

According to at least one embodiment of the present disclosure, a memory expansion card can include a controller including an at least eight bit wide host interface and thirty-six memory packages, each including two dies, coupled to the controller by two channels. Each channel can be seventy-two bits wide and capable of operating at four gigabits per second. The memory expansion card can consume less than or equal to 35.2 Watts at full bandwidth. Eighteen of the memory packages can be on a same side of the memory expansion card as the controller and eighteen of the memory packages can be on an opposite side of the memory expansion card as the controller. The host interface can be CXL compliant, and the memory expansion card can conform to the E1.S form factor.

Figure 13:
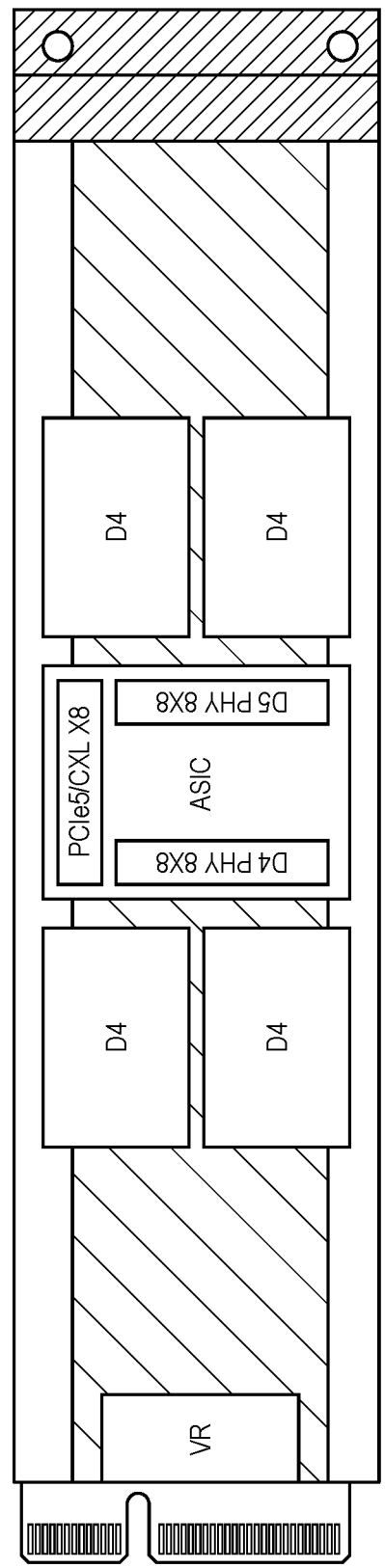
FIG. 13 is a block diagram of a memory expansion card having sixteen channels and eight packages according to the present disclosure.

FIG. 13 is a block diagram of a memory expansion card having sixteen channels and eight packages according to the present disclosure. The memory expansion card has multi-channel ×8 serial operation mode and two ranks. Each of the D4 (which is an abbreviation for DDR4) channels to the memory die can run at 3.2 Gb/s. The memory can consume 12.75 W at full bandwidth of 51.2 GB/s. The realizable bandwidth can be about 25.6 GB/s. The controller consumes about 15 W. The capacity of the memory expansion card can be 1 TB total and 750 GB addressable for a quad die dual channel package.

In some embodiments, although not specifically illustrated, memory die can be placed on the back side of the memory expansion card. For example, four memory dies (or packages) can be placed on the front side and four memory dies (or packages) can be placed on the back side. In such embodiments, eight channels would be used on the front side (two for each die/package) and eight channels would be used on the back side (two for each die/package). Although memory die can be placed on the back side, in some embodiments, only one ASIC would be placed on the memory expansion card (on the front side as illustrated).

According to at least one embodiment of the present disclosure, a memory expansion card can include a controller including an at least eight bit wide host interface and eight memory packages coupled to the controller by sixteen channels. Each channel can be eight bits wide and capable of operating at 3.2 gigabits per second. The memory expansion card can consume less than or equal to 12.8 Watts at full bandwidth. For example, the full bandwidth can be 51.2 gigabytes per second. Four of the memory packages can be on a same side of the memory expansion card as the controller and four of the memory packages can be on an opposite side of the memory expansion card as the controller. The host interface can be CXL compliant, the channels can be LPDDR5 compliant, and the memory expansion card can conform to the E1.S form factor.

Figure 14:
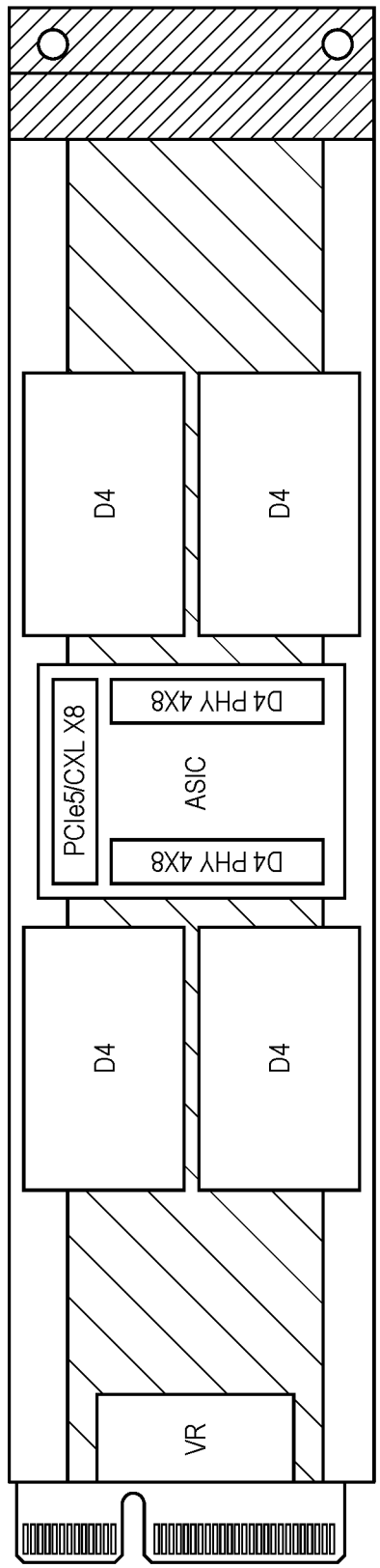
FIG. 14 is a block diagram of a memory expansion card having eight channels and eight packages according to the present disclosure.

FIG. 14 is a block diagram of a memory expansion card having eight channels and eight packages according to the present disclosure. The memory expansion card has multi-channel ×8 serial operation mode and two ranks. Each of the D4 channels to the memory die can run at 3.2 Gb/s. The memory can consume 6.76 W at full bandwidth of 25.6 GB/s. The controller consumes about 15 W. The capacity of the memory expansion card can be 512 GB total for a quad die single channel package.

In some embodiments, although not specifically illustrated, memory die can be placed on the back side of the memory expansion card. For example, four memory dies (or packages) can be placed on the front side and four memory dies (or packages) can be placed on the back side. In such embodiments, four channels would be used on the front side (one for each die/package) and four channels would be used on the back side (one for each die/package). Although memory die can be placed on the back side, in some embodiments, only one ASIC would be placed on the memory expansion card (on the front side as illustrated).

According to at least one embodiment of the present disclosure, a memory expansion card can include a controller including an at least eight bit wide host interface and eight memory packages coupled to the controller by eight channels. Each channel can be eight bits wide and capable of operating at 3.2 gigabits per second. The memory expansion card can consume less than or equal to 6.8 Watts at full bandwidth. For example, the full bandwidth can be 25.6 gigabytes per second. Four of the memory packages can be on a same side of the memory expansion card as the controller and four of the memory packages can be on an opposite side of the memory expansion card as the controller. The host interface can be CXL compliant, the channels can be LPDDR5 compliant, and the memory expansion card can conform to the E1.S form factor.

Figure 15:
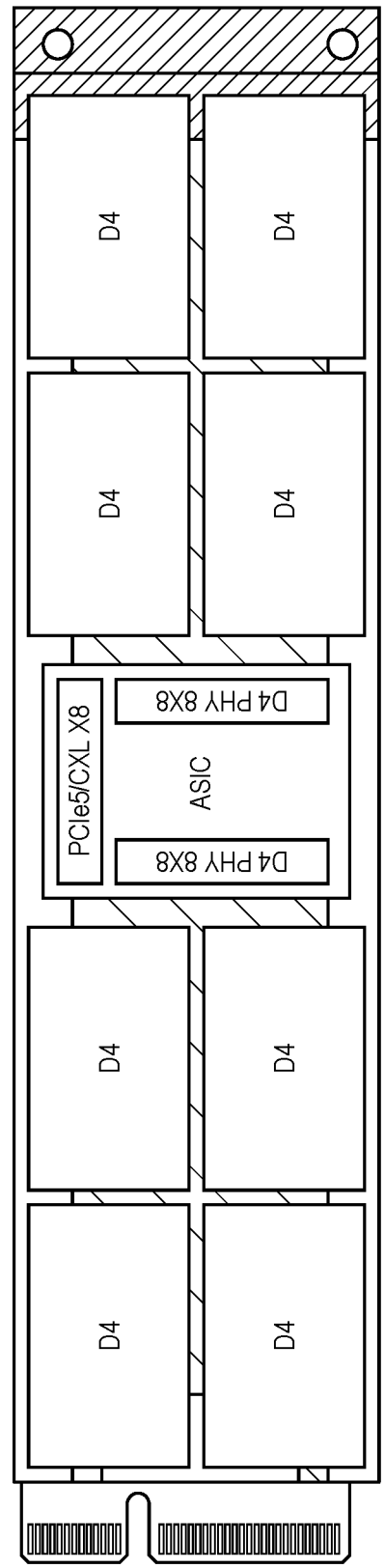
FIG. 15 is a block diagram of a memory expansion card having sixteen channels and sixteen packages according to the present disclosure.

FIG. 15 is a block diagram of a memory expansion card having sixteen channels and sixteen packages according to the present disclosure. The memory expansion card has multi-channel ×8 serial operation mode and two ranks. Each of the D4 channels to the memory die can run at 3.2 GB/s. The memory can consume 13.52 W at full bandwidth of 51.2 GB/s. The controller consumes about 15 W. The capacity of the memory expansion card can be 1 TB total for a dual die single channel package.

In some embodiments, although not specifically illustrated, memory die can be placed on the back side of the memory expansion card. For example, eight memory dies (or packages) can be placed on the front side and eight memory dies (or packages) can be placed on the back side. In such embodiments, eight channels would be used on the front side (one for each die/package) and eight channels would be used on the back side (one for each die/package). Although memory die can be placed on the back side, in some embodiments, only one ASIC would be placed on the memory expansion card (on the front side as illustrated).

According to at least one embodiment of the present disclosure, a memory expansion card can include a controller including an at least eight bit wide host interface and sixteen memory packages coupled to the controller by sixteen channels. Each channel can be eight bits wide and capable of operating at 3.2 gigabits per second. The memory expansion card can consume less than or equal to 13.6 Watts at full bandwidth. For example, the full bandwidth can be 51.2 gigabytes per second. Eight of the memory packages can be on a same side of the memory expansion card as the controller and eight of the memory packages can be on an opposite side of the memory expansion card as the controller. The host interface can be CXL compliant, the channels can be LPDDR5 compliant, and the memory expansion card can conform to the E1.S form factor.

Figure 16:
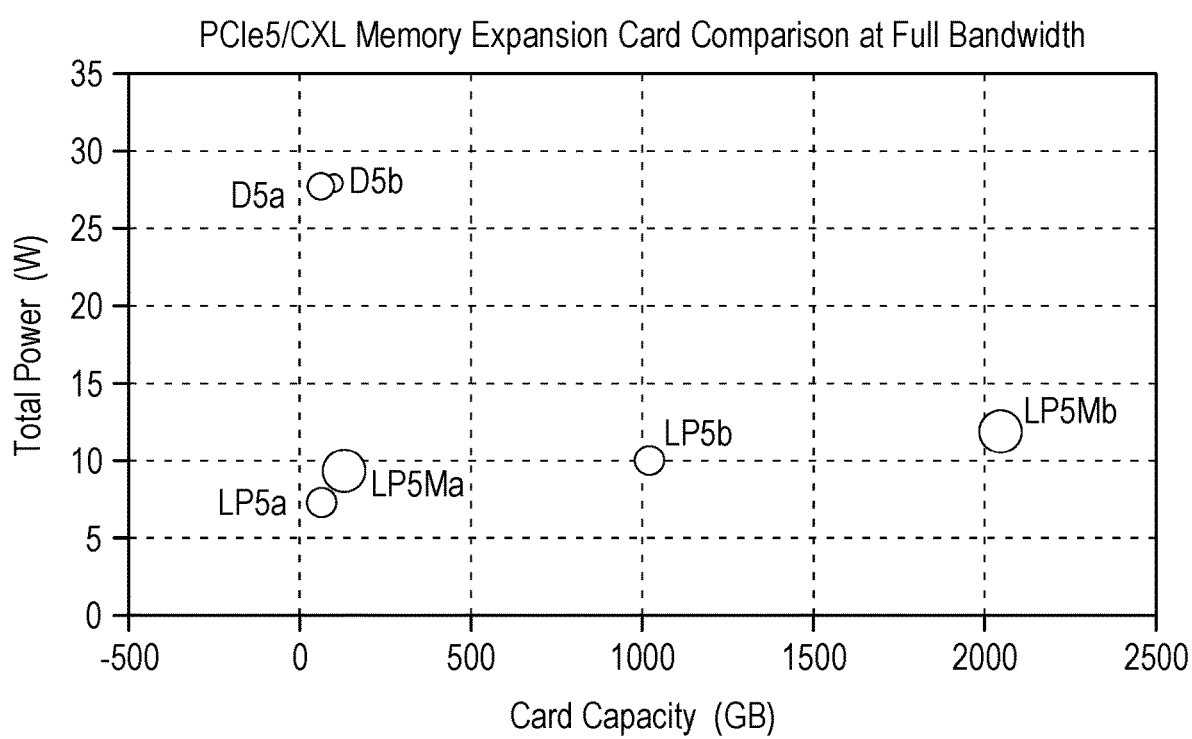
FIG. 16 is a plot comparing different memory expansion cards at peak bandwidth according to the present disclosure.

FIG. 16 is a plot comparing different memory expansion cards at peak bandwidth according to the present disclosure. Table 2 compares different memory expansion cards at peak bandwidth according to the present disclosure.

TABLE 2

| Tech | Config | Capacity | MP | CP | TP | BW | Count | Density |
|------|--------|----------|------|-----|-------|-------|-------|---------|
| LP5Mb | A | 2048 | 4.4 | 7.5 | 11.9 | 64 | 256 | 64 |
| LP5b | A | 1024 | 2.51 | 7.5 | 10.0 | 64 | 256 | 32 |
| LP5Ma | B | 128 | 4.4 | 5 | 9.4 | 64 | 32 | 32 |
| D5b | C | 96 | 16.7 | 11 | 27.7 | 64 | 36 | 24 |
| LP5a | B | 64 | 2.35 | 5 | 7.4 | 64 | 32 | 16 |
| D5a | C | 64 | 16.7 | 11 | 27.7 | 64 | 36 | 16 |
| D5b | D | 384 | 27.5 | 11 | 38.5 | 64 | 160 | 24 |
| D5c | D | 512 | 27.5 | 11 | 38.5 | 64 | 160 | 32 |
| D5b | E | 1536 | 120.8 | CPU | 120.8 | 358.4 | 640 | 24 |
| D5c | E | 2048 | 120.8 | CPU | 120.8 | 358.4 | 640 | 32 |

The column labeled "Tech" is the technology type. The column labeled "Config" is the configuration. A is 16 LP5 8 Rank 2 Gb/s. B is 8 LP5 Quad Rank 4 Gb/s. C is 2 RDIMM equivalent 1 Rank 4 Gb/s. D is 2 10×4 RDIMM 2DPC 4 Gb/s. E is 8 10×4 RDIMM 2DPC 5.6 Gb/s. The column labeled "Capacity" is the card capacity in GB. The column labeled "MP" is the memory power in W. The column labeled "CP" is the controller power in W. The column labeled "TP" is the total power in W. The column labeled "BW" is the peak memory bandwidth in GB/s. The column labeled "Count" is the die count. The column labeled "Density" is the die density.

Figure 17:
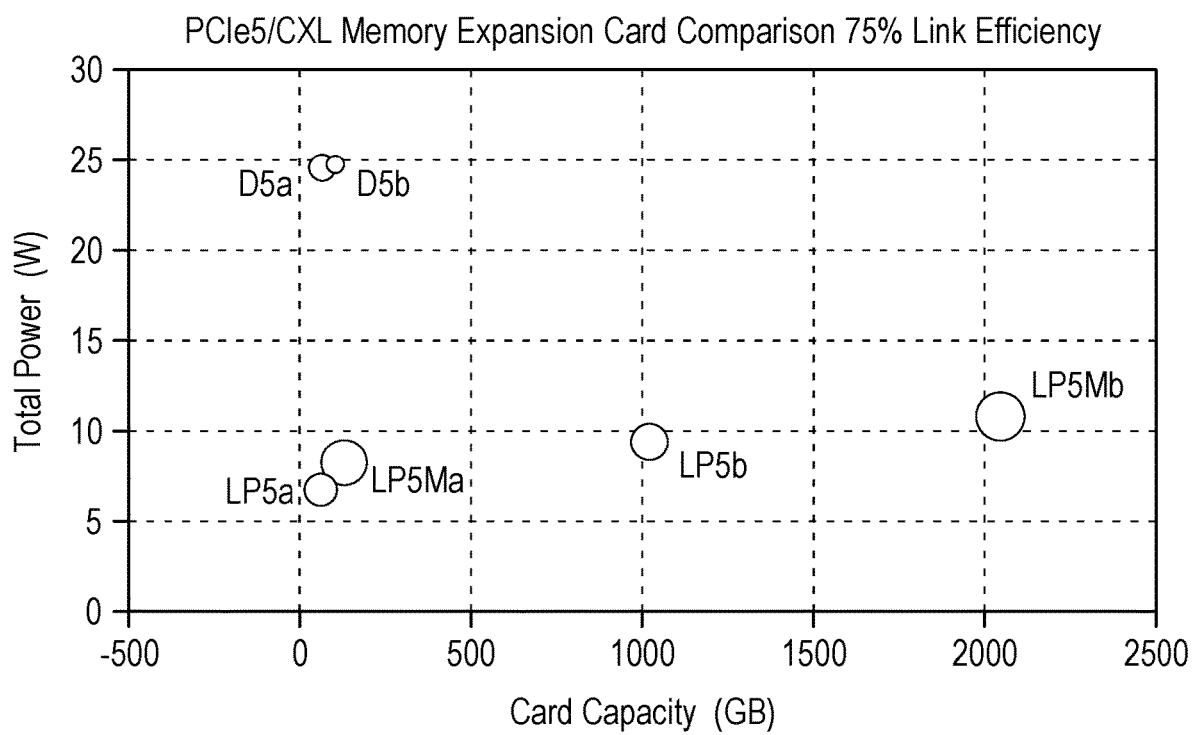
FIG. 17 is a plot comparing different memory expansion cards at 75% CXL link efficiency according to the present disclosure.

FIG. 17 is a plot comparing different memory expansion cards at 75% CXL link efficiency according to the present disclosure. Table 3 compares different memory expansion cards at 75% CXL link efficiency according to the present disclosure. The table columns and configuration definitions are analogous to those of Table 2.

TABLE 3

| Tech | Config | Capacity | MP | CP | TP | BW | Count |
|------|--------|----------|------|-----|-------|-----|-------|
| LP5Ma | B | 128 | 3.3 | 5 | 8.3 | 48 | 32 |
| LP5Mb | A | 2048 | 3.3 | 7.5 | 10.8 | 48 | 256 |
| LP5a | B | 64 | 1.77 | 5 | 6.77 | 48 | 32 |
| D5c | A | 1024 | 1.91 | 7.5 | 9.41 | 48 | 256 |
| D5a | C | 64 | 33.6 | 11 | 24.6 | 48 | 36 |
| D5b | C | 96 | 33.6 | 11 | 24.6 | 48 | 36 |
| D5b | E | 384 | 21.96 | 16 | 37.96 | 48 | 160 |
| D5c | E | 512 | 21.96 | 16 | 37.96 | 48 | 160 |

The plots in FIG. 16 and FIG. 17 show increasing total power consumed on the vertical axis and increasing card capacity on the horizontal axis. Therefore, it is desirable to have results on the far right and bottom of the plot. The memories listed in the plots and tables correspond to those described above.

FIG. 18 is a table of LP5 refresh parameters according to the present disclosure. The table is for a 16-bank architecture that supports all bank or per bank refresh operations. In data center applications, a 16 millisecond (ms) refresh window can be used for temperatures greater than 85 Celsius. In some embodiments, 8192 refresh commands can be executed every 16 ms. A refresh interval can be 1.95 microseconds (us). The refresh cycle time for all banks (tRFCab) can be about 380 nanoseconds (ns) for 16 Gb. The refresh cycle time per bank (tRFCpb) can be about 140 ns for 16 Gb. The probability of all-bank refresh collisions is about 19.5% (380 ns/1.95 us). The probability of per-bank refresh collisions is about 7.2% (140 ns/1.95 us). The bank conflict impact can be less than or equal to 60 ns.

FIG. 19 is a table of DDR5 refresh parameters according to the present disclosure. FIG. 20 is a table of DDR5 refresh granularity parameters according to the present disclosure. The tables are for a 32 bank architecture that supports all bank or same bank refresh. In data center applications, a 16 millisecond (ms) refresh window can be used for temperatures greater than 85 Celsius. In some embodiments, 8192 refresh commands can be executed every 16 ms. A refresh interval can be 1.95 microseconds (us). The refresh cycle time (tRFC1) can be 295 ns for 16 Gb. The probability of all-bank refresh collisions can be about 15% (295 ns/1.95 us). The bank conflict impact can be less than or equal to 47 ns.

Figure 21:
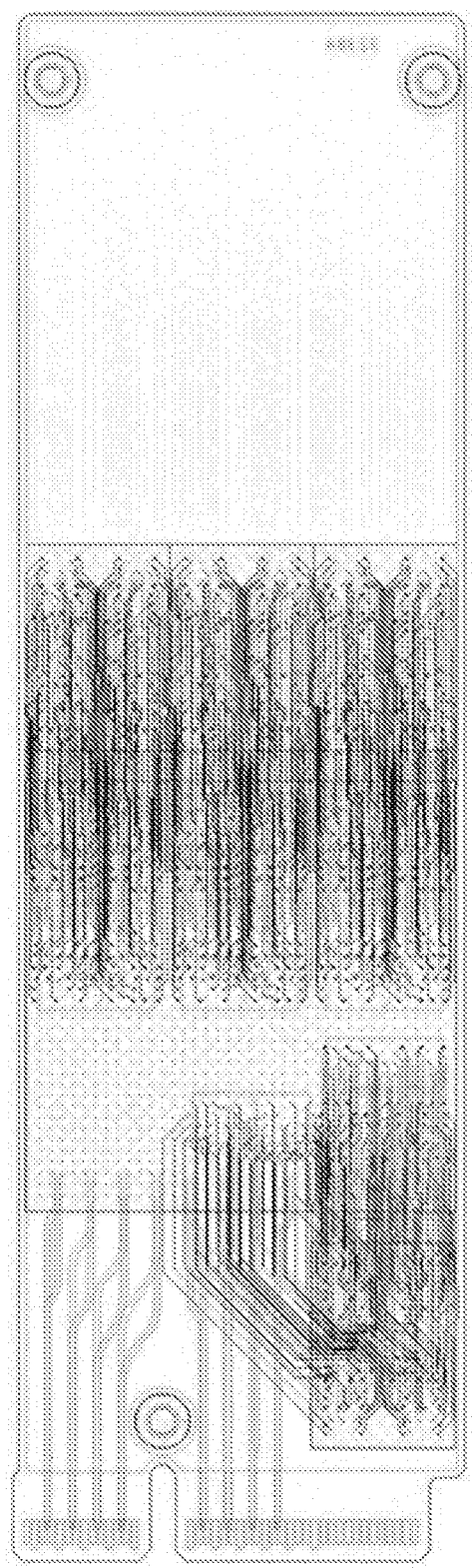
FIG. 21 is a circuit diagram illustrating the complexity of wiring connections from the host interface to the memory dies on a memory expansion card according to the present disclosure.

FIG. 21 is a circuit diagram illustrating the complexity of wiring connections from the host interface to the memory dies on a memory expansion card according to the present disclosure.

Figure 22A:
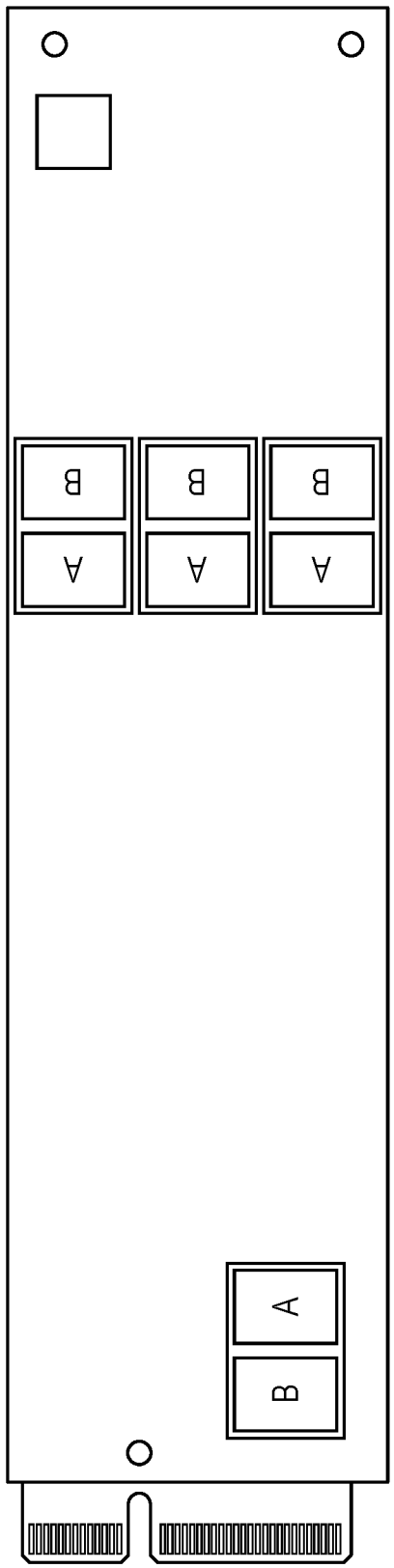
FIG. 22A illustrates a layout of a front side of a memory expansion card according to the present disclosure.
Figure 22B:
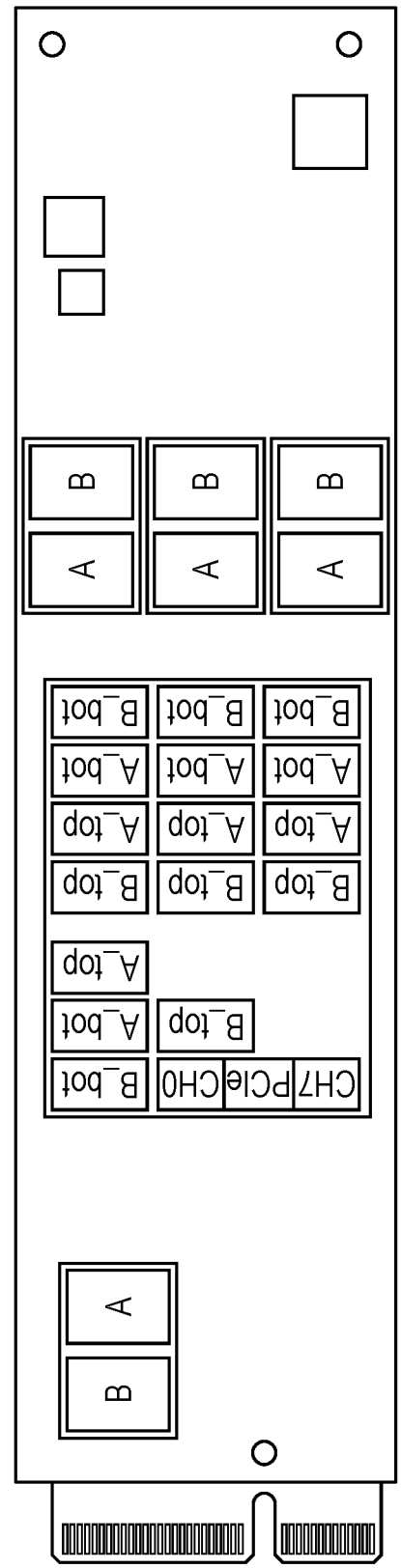
FIG. 22B illustrates a layout of a back side of the memory expansion card illustrated in FIG. 22A.

FIG. 22A illustrates a layout of a front side of a memory expansion card according to the present disclosure. FIG. 22B illustrates a layout of a back side of the memory expansion card illustrated in FIG. 22A. The areas marked "A" and "B" illustrate two different channels surrounded by a border that illustrates the extent of the package. The example includes 16 channels in a 20-layer stackup with 10 signal layers. The memory includes 8 packages with 4 on the front side and 4 on the back side. There are 2 channels per package for a total of 16 channels. Each memory die can have 200 balls with 8 chip select and 9 command/address pins. Each command/address pin can be routed independently with no bussing between channels.

Figure 23A:
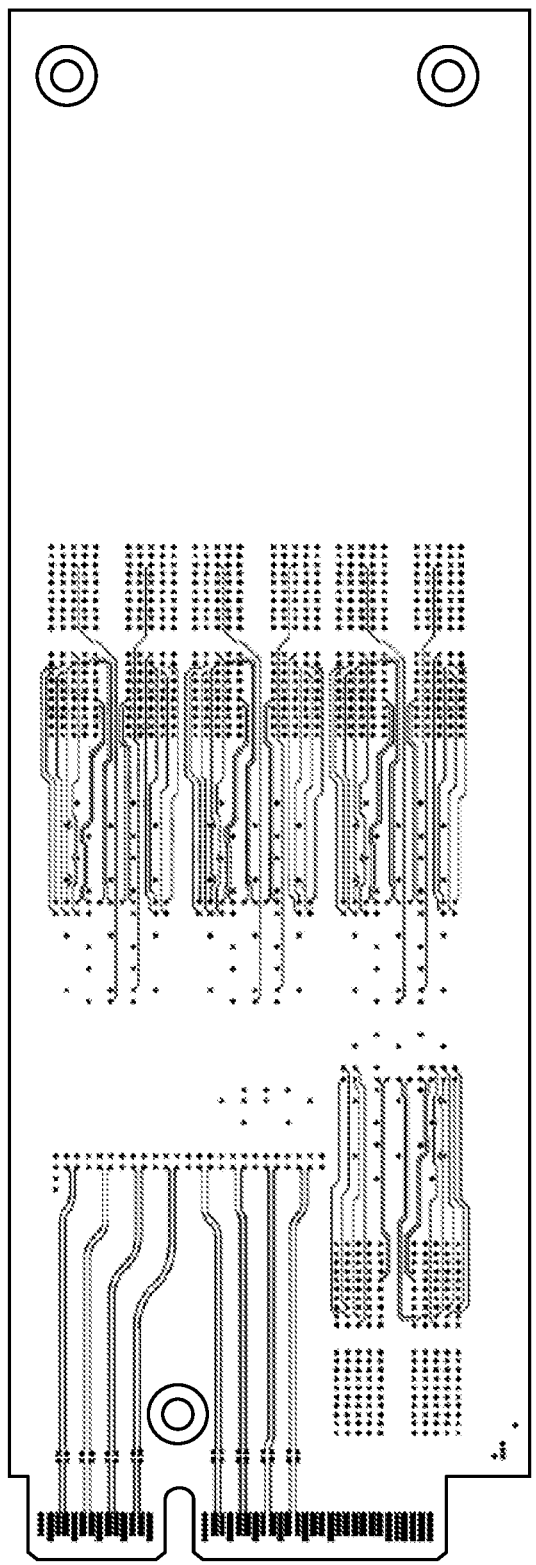
FIG. 23A is a circuit diagram illustrating the complexity of wiring connections from the host interface to the memory dies on the memory expansion card front side illustrated in FIG. 22A.
Figure 23B:
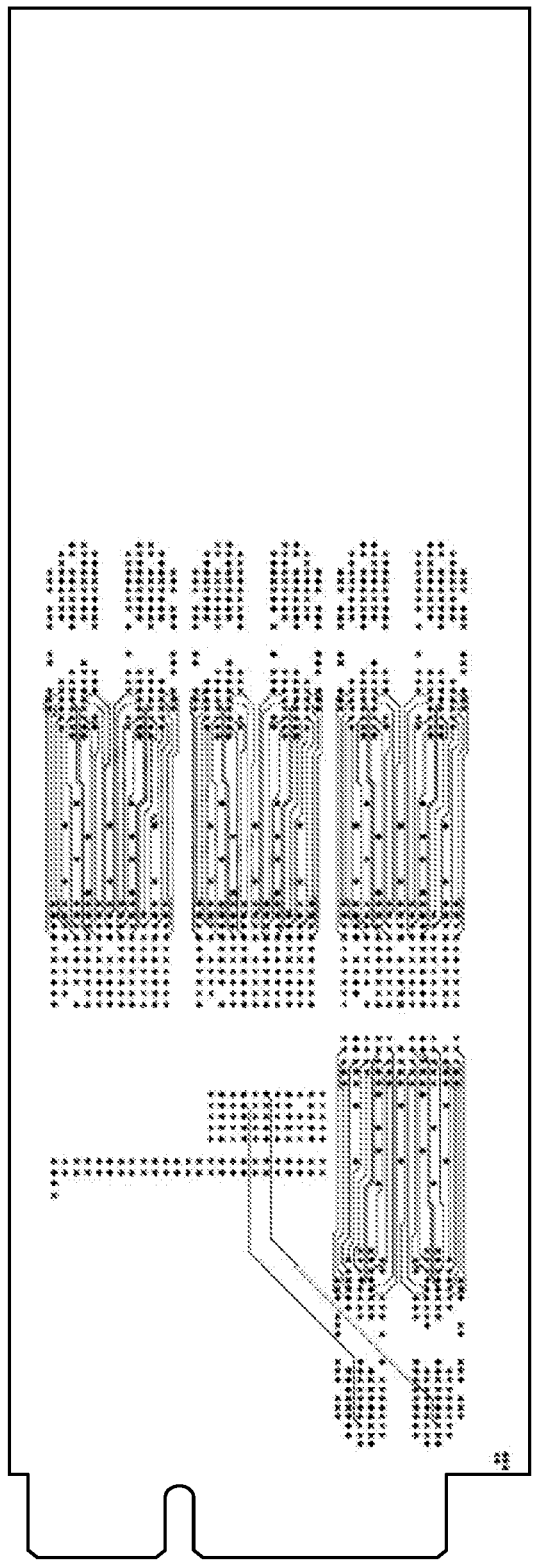
FIG. 23B is a circuit diagram illustrating the complexity of wiring connections from the host interface to the memory dies on the memory expansion card back side illustrated in FIG. 22B.

FIG. 23A is a circuit diagram illustrating the complexity of wiring connections from the host interface to the memory dies on the memory expansion card front side illustrated in FIG. 22A. FIG. 23B is a circuit diagram illustrating the complexity of wiring connections from the host interface to the memory dies on the memory expansion card back side illustrated in FIG. 22B.

Figure 24A:
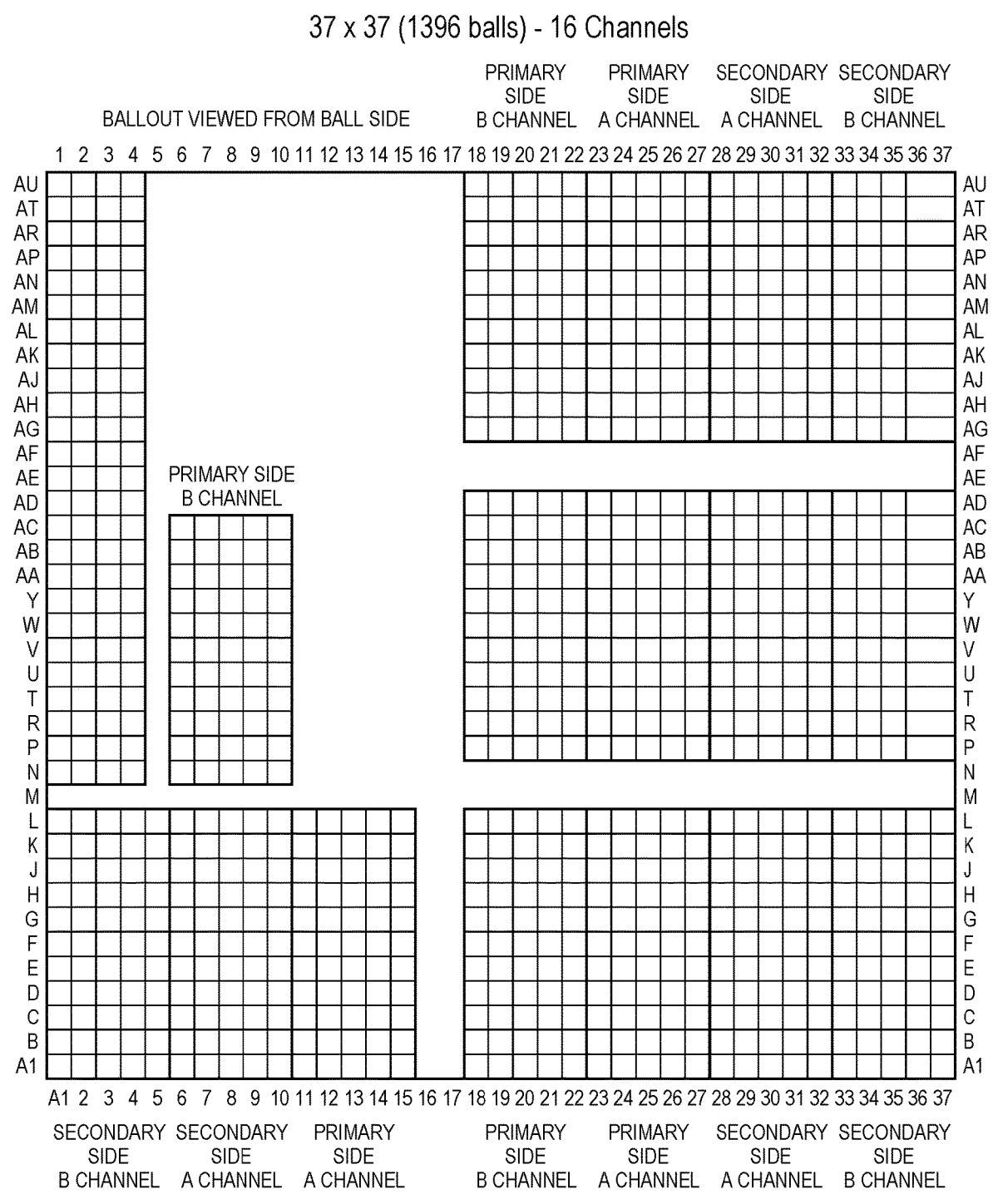

FIG. 24A is a block diagram of a controller of a memory expansion card according to the present disclosure. FIG. 24B is an enlarged view of a portion of the controller illustrated in FIG. 24A. The controller can have a 37×37 ball matrix, for example. The controller can include 16 channel ball groups of 5×11 balls each. The controller can include a 55 ball pattern with 46 signals. The controller can include 9 power/ground for each channel for signal separation. The controller can be optimized to match the layout of the memory expansion card. The channel block pinouts can be optimized for clean routes.

FIG. 25 is a block diagram of a 200 ball package according to the present disclosure. The ball package includes 2 channels×16 and is 8 die pack capable. The ball package is capable of 4.266 Gb/s, but can be operated at 2 Gb/s, for example. The ball package can include 9 command/address pins and 8 chip select pins.

FIG. 26 is a table illustrating a range of capacity available for the memory expansion card for different arrangements and memory types.

Embodiments can include a tangible machine-readable storage medium (also known as a computer-readable medium) on which is stored one or more sets of instructions or software embodying any one or more of the methodologies or functions described herein. In some embodiments, a memory device or a processing device constitutes a machine-readable medium. The term "machine-readable storage medium" includes a single medium or multiple media that store the one or more sets of instructions. The term "machine-readable storage medium" includes any medium that is capable of storing or encoding a set of instructions for execution by the machine and that cause the machine to perform any one or more of the methodologies of the present disclosure. The term "machine-readable storage medium" includes, but is not be limited to, solid-state memories, optical media, and magnetic media.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
 a memory expansion card including:
  a controller including an at least eight bit wide host interface; and
  eight memory packages coupled to the controller by eight channels;
 wherein each of the channels is sixteen bits wide;
 wherein each channel is capable of operating at four gigabits per second;
 wherein the memory expansion card consumes less than or equal to 9.5 Watts at full bandwidth; and
 wherein the memory expansion card consumes less than or equal to 8.8 Watts at 85% host interface efficiency.

2. The apparatus of claim 1, wherein four of the memory packages are on a same side of the circuit board as the controller; and
 wherein four of the memory packages are on an opposite side of the circuit board as the controller.

3. The apparatus of claim 1, wherein the full bandwidth is at least 64 gigabytes per second.

4. The apparatus of claim 1, wherein the host interface is CXL compliant;
 wherein the channels are LPDDR5 compliant; and
 wherein the circuit board conforms to E1.S form factor.

5. The apparatus of claim 1, wherein the memory expansion card includes sixteen memory packages coupled to the controller by sixteen channels;

wherein each channel is capable of operating at two gigabits per second;
wherein the memory expansion card consumes less than or equal to 11.9 Watts at full bandwidth; and
wherein the memory expansion card consumes less than or equal to 11.3 Watts at 85% host interface efficiency.

6. The apparatus of claim 5, wherein eight of the memory packages are on a same side of the memory expansion card as the controller; and
wherein eight of the memory packages are on an opposite side of the memory expansion card as the controller.

7. An apparatus, comprising:
a memory expansion card including:
a controller including an at least eight bit wide host interface; and
thirty-six memory packages, each including one die, coupled to the controller by two channels;
wherein each of the channels is seventy-two bits wide;
wherein each channel is capable of operating at four gigabits per second; and
wherein the memory expansion card consumes less than or equal to 27.7 Watts at full bandwidth.

8. The apparatus of claim 7, wherein eighteen of the memory packages are on a same side of the memory expansion card as the controller; and
wherein eighteen of the memory packages are on an opposite side of the memory expansion card as the controller.

9. The apparatus of claim 8, wherein the host interface is CXL compliant; and
wherein the memory expansion card conforms to E1.S form factor.

10. The apparatus of claim 7, wherein each package includes two dies; and
wherein the memory expansion card consumes less than or equal to 35.2 Watts at full bandwidth.

11. An apparatus, comprising:
a memory expansion card including:
a controller including an at least eight bit wide host interface; and
eight memory packages coupled to the controller by eight channels;
wherein each of the channels is eight bits wide;
wherein each channel is capable of operating at 3.2 gigabytes per second; and
wherein the memory expansion card consumes less than or equal to 6.8 Watts at full bandwidth.

12. The apparatus of claim 11, wherein four of the memory packages are on a same side of the memory expansion card as the controller; and
wherein four of the memory packages are on an opposite side of the memory expansion card as the controller.

13. The apparatus of claim 12, wherein the full bandwidth is at least 25.6 gigabytes per second.

14. The apparatus of claim 13, wherein the host interface is CXL compliant; and
wherein the memory expansion card conforms to E1.S form factor.

15. The apparatus of claim 11, wherein the eight memory packages are coupled to the controller by sixteen channels; and
wherein the memory expansion card consumes less than or equal to 12.8 Watts at full bandwidth.

16. The apparatus of claim 15, wherein the full bandwidth is at least 51.2 gigabytes per second.

17. The apparatus of claim 11, wherein the memory expansion card includes sixteen memory packages coupled to the controller by sixteen channels; and
wherein the memory expansion card consumes less than or equal to 13.6 Watts at full bandwidth.

18. The apparatus of claim 17, wherein eight of the memory packages are on a same side of the memory expansion card as the controller; and
wherein eight of the memory packages are on an opposite side of the memory expansion card as the controller.

19. The apparatus of claim 18, wherein the full bandwidth is at least 51.2 gigabytes per second.

* * * * *